(12) United States Patent
Watanabe et al.

(10) Patent No.: US 7,948,221 B2
(45) Date of Patent: May 24, 2011

(54) ELECTRIC POWER CONVERTER

(75) Inventors: Yasuto Watanabe, Saitama (JP);
Mitsuaki Hirakawa, Saitama (JP);
Satoshi Hashino, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 704 days.

(21) Appl. No.: 11/987,566

(22) Filed: Nov. 30, 2007

(65) Prior Publication Data

US 2008/0211316 A1    Sep. 4, 2008

(30) Foreign Application Priority Data

Dec. 1, 2006    (JP) ................................. 2006-325693

(51) Int. Cl.
*G05F 1/618* (2006.01)
(52) U.S. Cl. .................... 323/271; 323/225; 307/110
(58) Field of Classification Search .............. 307/110;
323/225, 268, 222, 271, 259; 363/59–60, 363/62, 43; 327/536; 257/299
See application file for complete search history.

(56) References Cited

U.S. PATENT DOCUMENTS

| | | | | |
|---|---|---|---|---|
| 5,355,295 A | * | 10/1994 | Brennen | 363/40 |
| 5,956,243 A | * | 9/1999 | Mao | 363/61 |
| 6,084,789 A | * | 7/2000 | Van Lieshout | 363/60 |
| 2005/0174098 A1 | * | 8/2005 | Watanabe et al. | 323/282 |
| 2006/0176719 A1 | * | 8/2006 | Uruno et al. | 363/89 |

FOREIGN PATENT DOCUMENTS

| | | |
|---|---|---|
| JP | 2003-61339 A | 2/2003 |
| JP | 2003-111388 A | 4/2003 |
| JP | 2005-224060 A | 8/2005 |
| JP | 2006-271101 A | 10/2006 |

* cited by examiner

*Primary Examiner* — Harry Behm
(74) *Attorney, Agent, or Firm* — Birch, Stewart, Kolasch & Birch, LLP

(57) ABSTRACT

The invention provides an optimal electric power converter for a DC/DC converter which variably steps up a voltage successively with an optional magnification of one to two times or more and/or step down a voltage successively with a step-down ratio of one time or less. The converter includes a first input-output part, an inductor connected with a positive or a negative electrode side of the first input-output part, plural switches, plural capacitors, a second input-output part connected with plural capacitors, and a control circuit, wherein the control circuit controls the plural switches with operation mode and makes the inductor and plural capacitors selectively functional, wherein the electric power converter is of a switched capacitance type that performs any operation out of step-up, step-down, regeneration, and continuity, and wherein the control circuit controls to have a period for which two switches out of the plural switches are simultaneously turned ON.

6 Claims, 15 Drawing Sheets

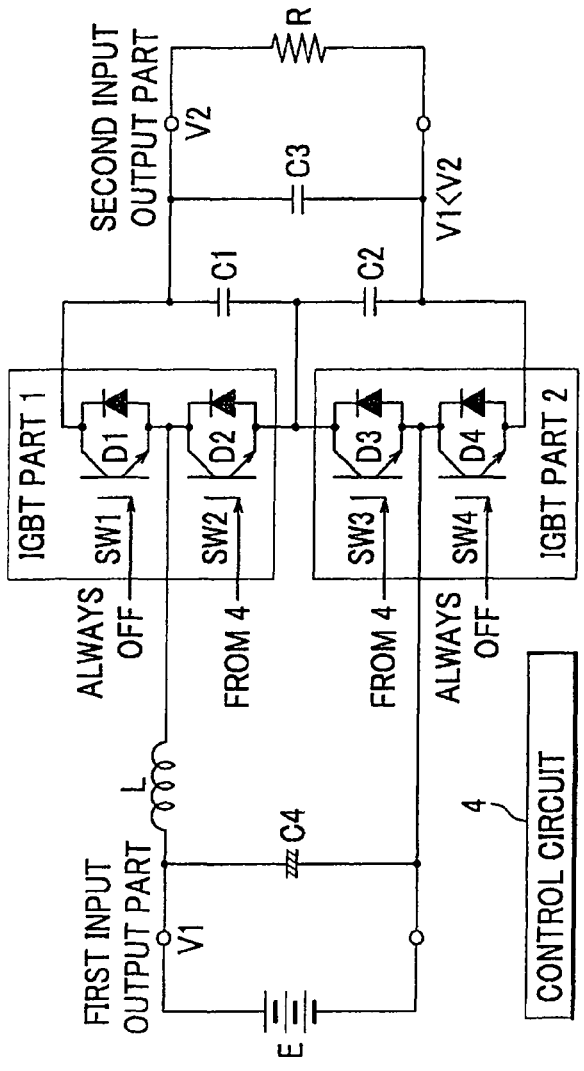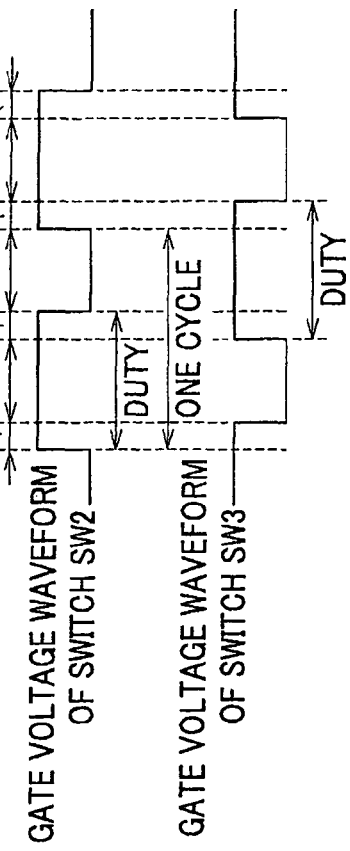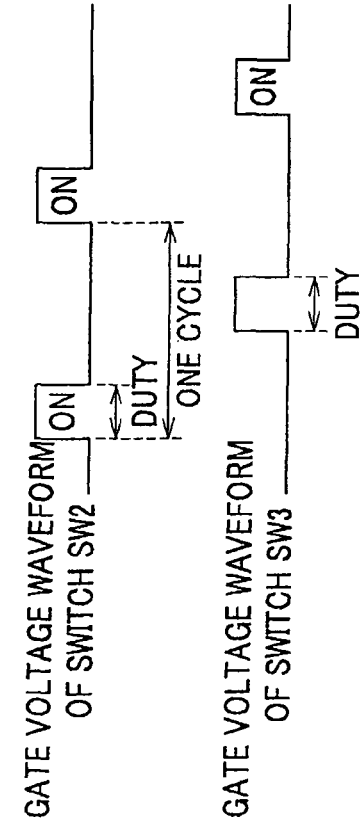

STEP-DOWN RATIO OF 0 TO 0.5 TIMES

STEP-DOWN RATIO OF 0.5 TO 1 TIMES

MODE 2 (C2 CHARGING PERIOD)

MODE 3(C1 CHARGING PERIOD)

(SIMULTANEOUSLY  (SIMULTANEOUSLY TURNING ON)
TURNING ON)

MODE 1 (SIMULTANEOUS ON PERIOD)

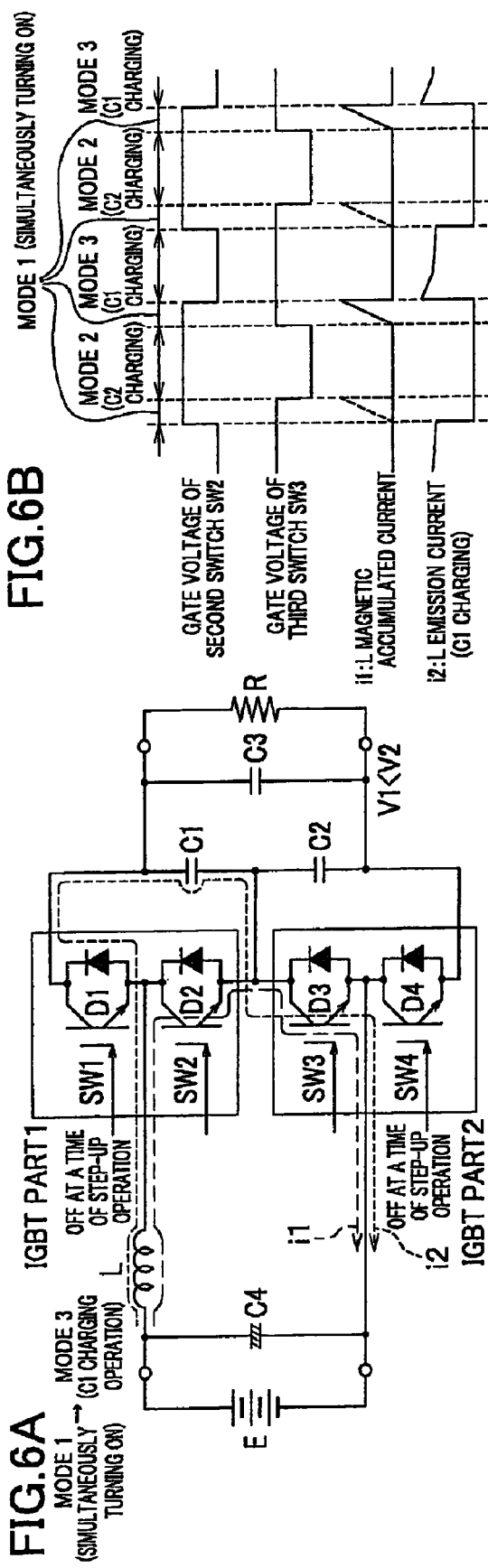

FIG.7A C1 DISCHARGING OPERATION

FIG.7C C2 DISCHARGING OPERATION

FIG.8A
(SIMULTANEOUSLY TURNING ON) (SIMULTANEOUSLY TURNING ON)
MODE1 MODE2 MODE3 MODE1
SW1: ON / OFF
SW4: OFF / ON
iL: |Aripl|
FIG.8B
MODE 2 (C1 DISCHARGING PERIOD)
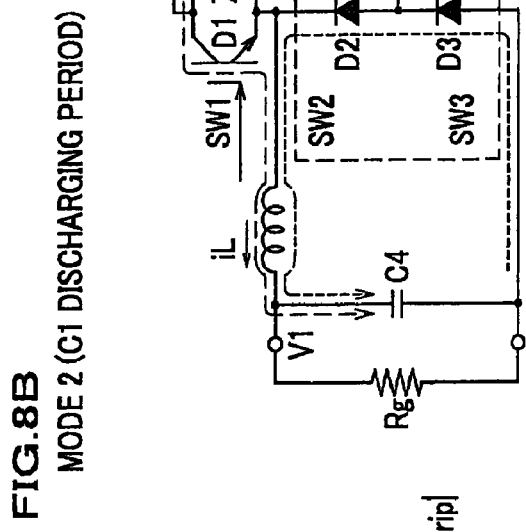
FIG.8C
MODE 1 (SIMULTANEOUS ON PERIOD)
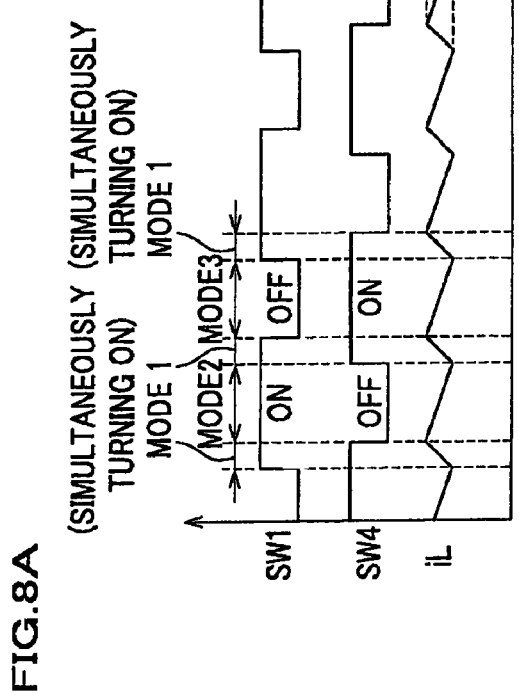
FIG.8D
MODE 3 (C2 DISCHARGING PERIOD)
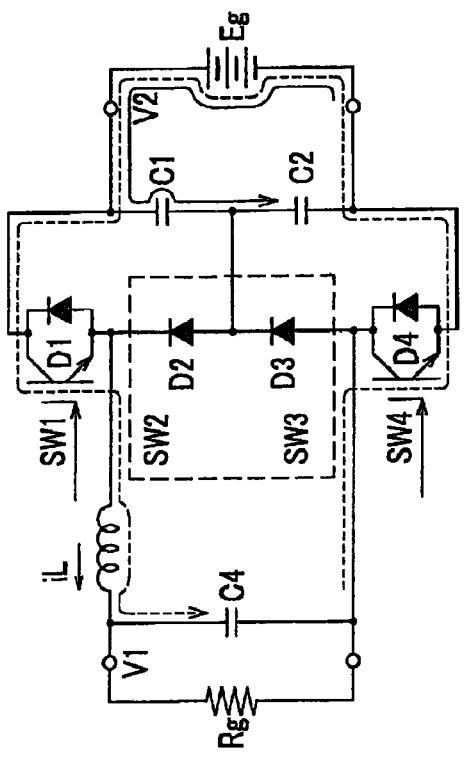

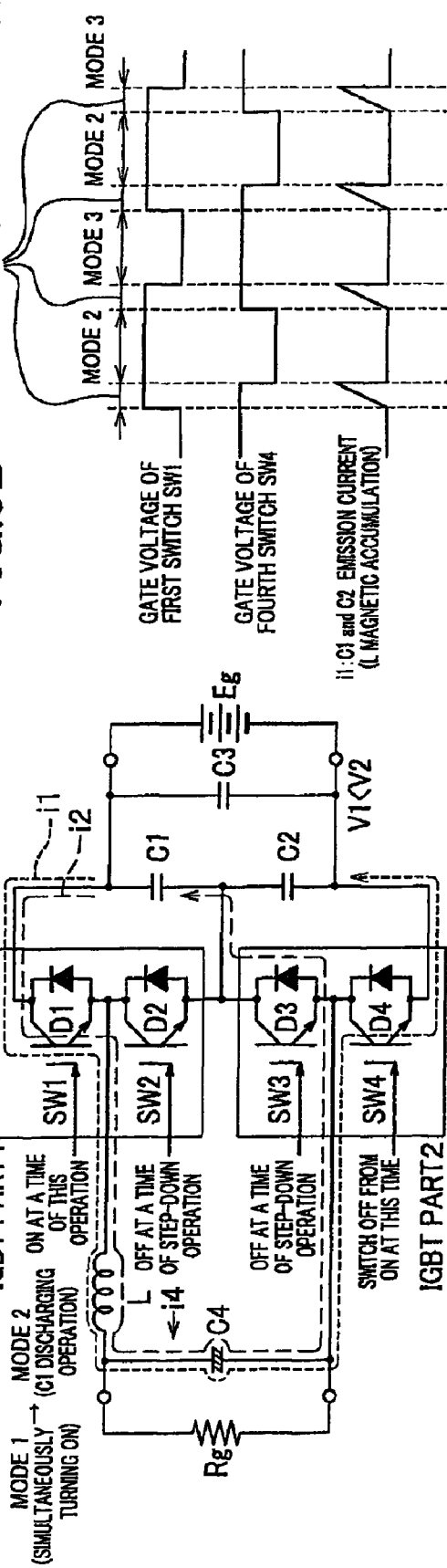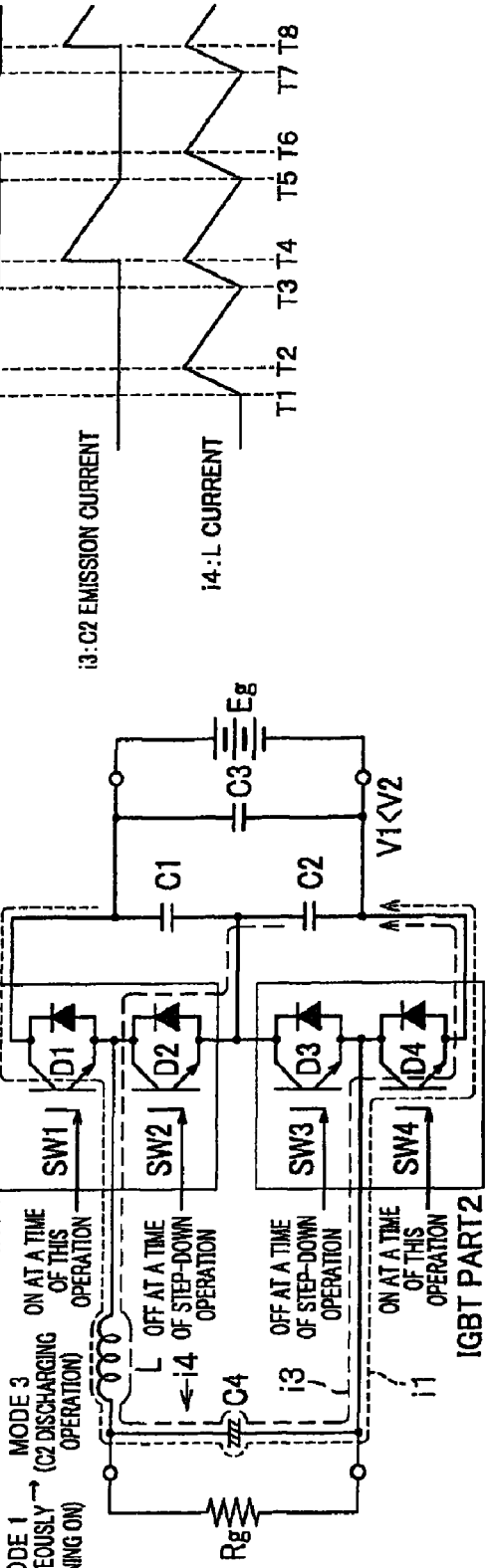
FIG.9A
FIG.9B
FIG.9C

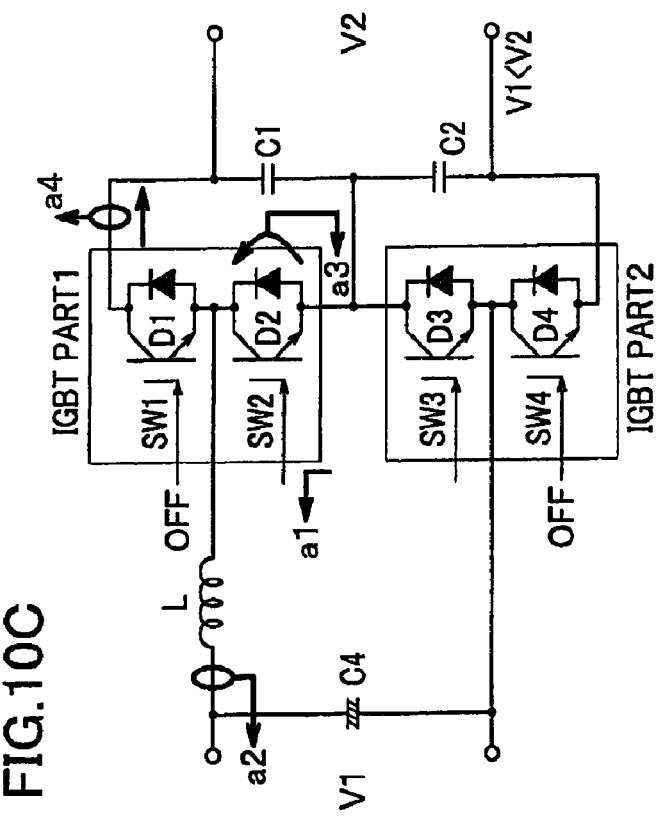
FIG.10C
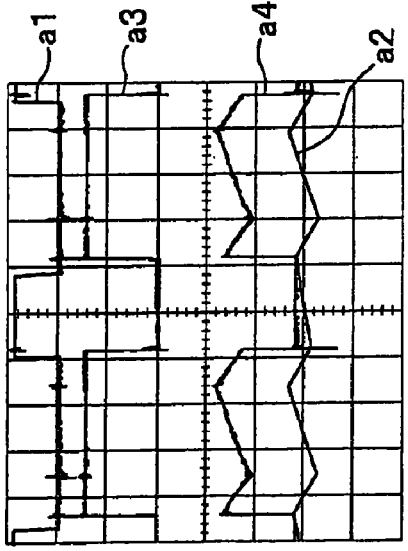
FIG.10A  STEP-UP RATIO OF 1 TO 2 TIMES
| INPUT VOLTAGE (V) | INPUT CURRENT (A) | INPUT POWER (W) | OUTPUT VOLTAGE (V) | OUTPUT CURRENT (A) | OUTPUT POWER (W) | EFFICIENCY (%) |
|---|---|---|---|---|---|---|
| 99.1 | 26.4 | 2621.2 | 150.1 | 16.8 | 2627.3 | 96.4 |
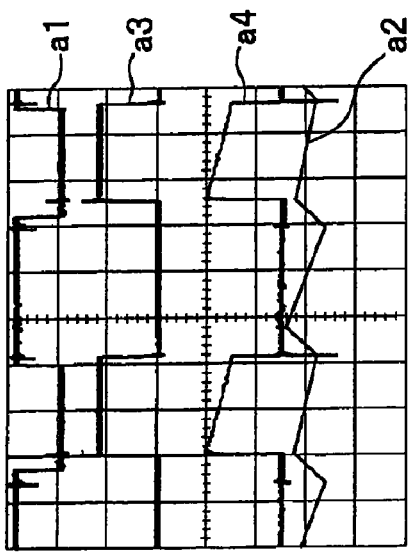
FIG.10B  STEP-UP RATIO OF 2 TIMES OR MORE
| INPUT VOLTAGE (V) | INPUT CURRENT (A) | INPUT POWER (W) | OUTPUT VOLTAGE (V) | OUTPUT CURRENT (A) | OUTPUT POWER (W) | EFFICIENCY (%) |
|---|---|---|---|---|---|---|
| 100.1 | 28.1 | 2606.5 | 250.5 | 9.9 | 2478.4 | 95.1 |

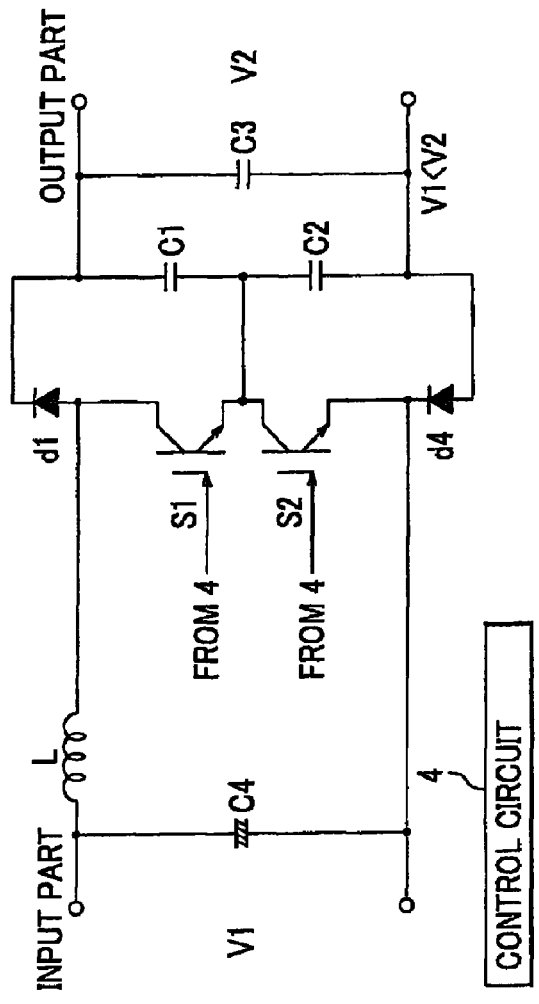
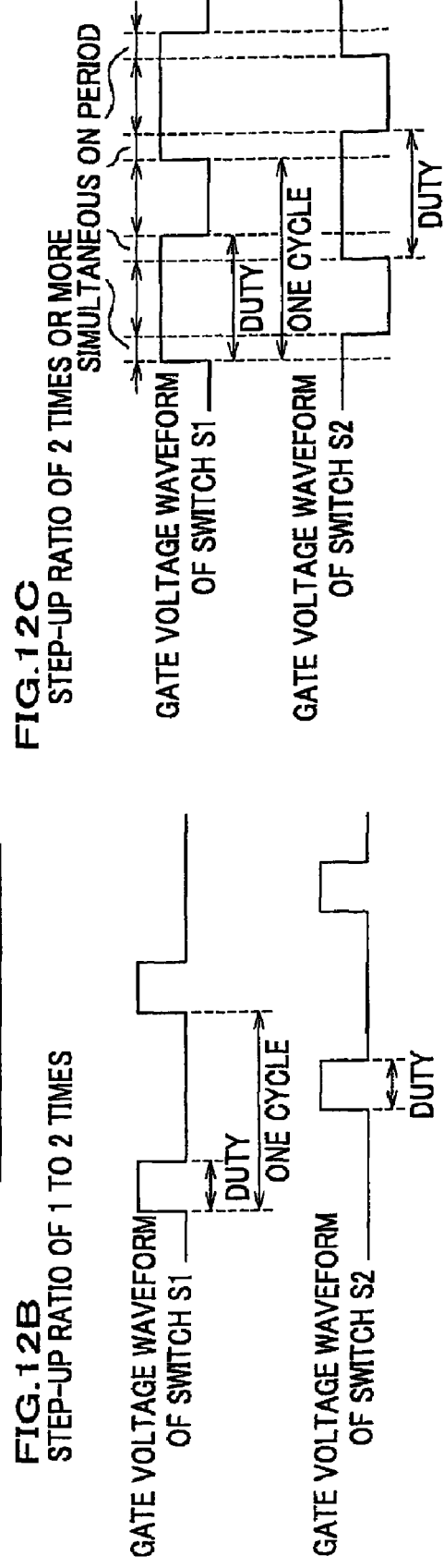
FIG.12A
FIG.12B
STEP-UP RATIO OF 1 TO 2 TIMES
FIG.12C
STEP-UP RATIO OF 2 TIMES OR MORE

STEP-DOWN RATIO OF 0 TO 0.5 TIMES

STEP-DOWN RATIO OF 0.5 TO 1 TIMES
SIMULTANEOUS ON PERIOD

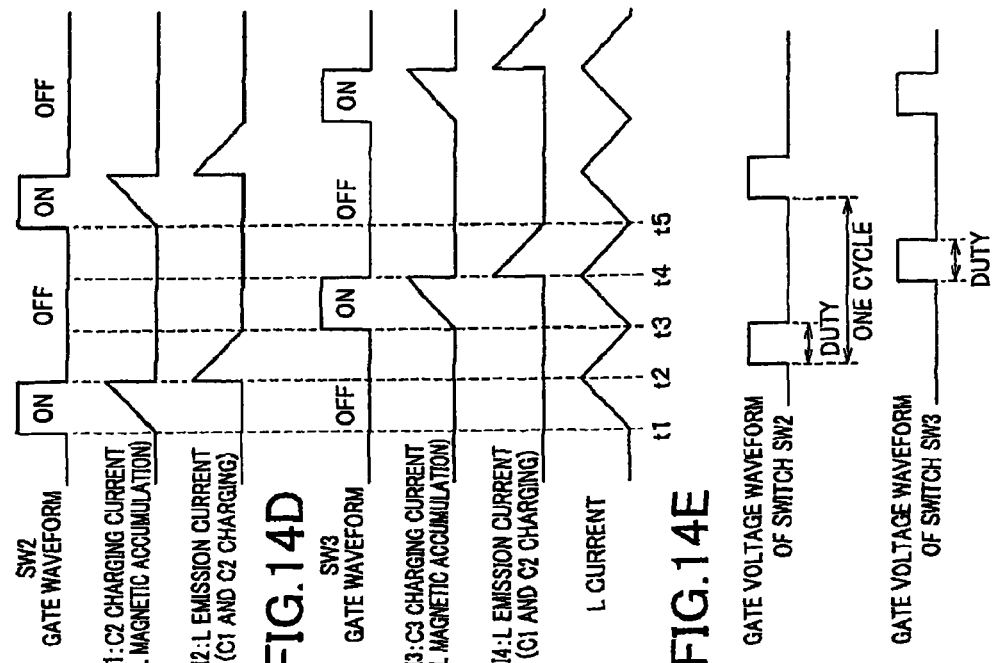
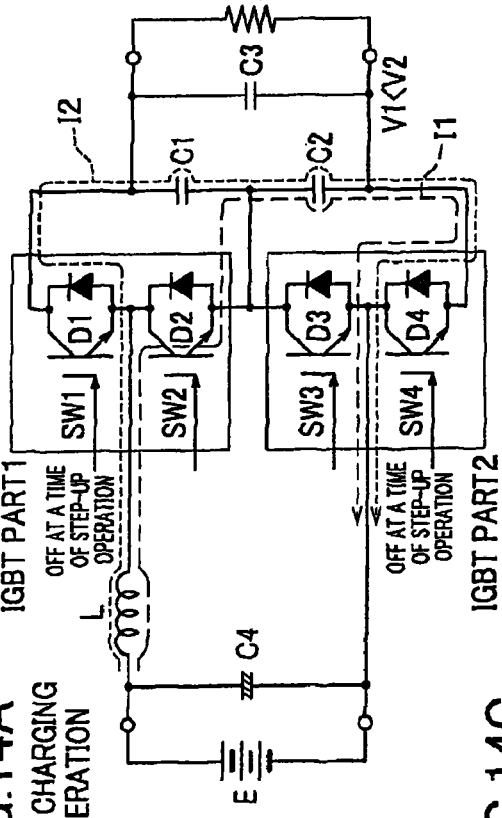
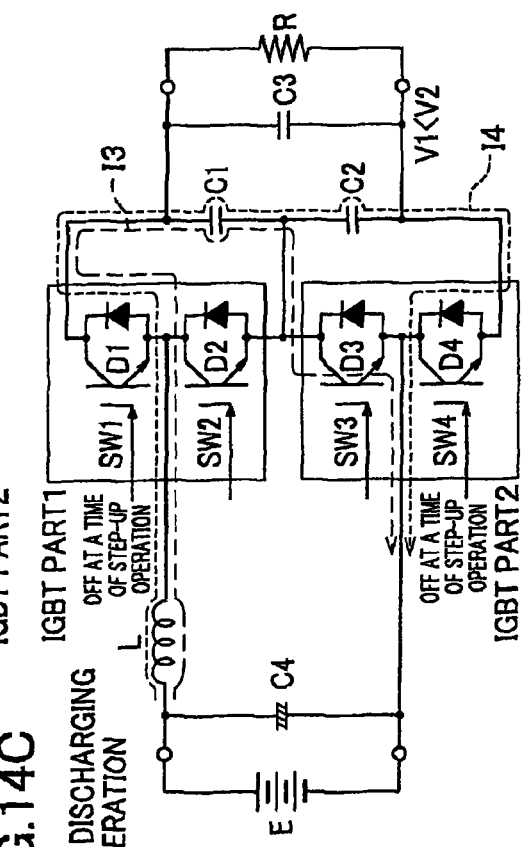

ELECTRIC POWER CONVERTER

BACKGROUND OF INFORMATION

1. Field of the Invention

The present invention relates to an electric power converter suitable for a DC/DC converter, particularly, which steps up a direct voltage at an optional magnification of one to two times or more and steps down the direct voltage at an optional magnification of one time or less.

2. Description of the Related Art

An electric power converter includes a DC/DC converter which converts DC (direct current) voltage. The DC/DC converter is used in various devices, for example, a power generator using a solar cell, a wind power generator, a fuel cell system, a hybrid vehicle and the like. In particular, if the DC/DC converter is applied in a technological domain, wherein there is severe, spatial and weight limitations, particularly in a motor vehicle, more demands for downsizing and weight reduction of the DC/DC converter are generated.

As for a conventional step-up DC/DC converter, for example, in a step-up DC/DC converter circuit disclosed in Patent Document 1 JP 2006-271101A, a switch is alternately turned ON/OFF. When the switch is turned ON, magnetic energy is accumulated in an inductor. When the switch is turned OFF, the magnetic energy accumulated in the inductor is supplied to an output part as electric power. In this time, as an output voltage from the inductor adds to a power supply voltage, a step-up voltage in the aggregate is obtained at the output part. A step-up ratio, namely, a ratio of an output voltage to an input voltage, changes depending on an ON-time duty ratio of the switch.

However, in this step-up method, an inductor having a heavy, large core is necessary to prevent magnetic saturation of the inductor and step up voltage sufficiently. This constitutes a factor of impediment to downsizing and weight reduction of an entire DC/DC converter.

For this reason, as for devices such as a cellular phone and the like, wherein there is a great need for downsizing and weight reduction, a charge pump circuit used a capacitor called as a flying capacitor is recommended as a voltage conversion mode (for example, refer to Patent Document 2 JP 2003-61339A). Similarly, as in the past, a stabilized power supply circuit used a switched capacitance mode is also recommended as usual (for example, refer to Patent Document 3 JP 2003-111388A).

In these modes, it is general to use the flying capacitor for storing electric power. Charging for a plurality of flying capacitors is alternately repeated by means of alternate switching of a plurality of switches and the like. This method outputs a fixed voltage of twice times but fails to flexibly select and output an optional ratio of conversion in accordance with necessity.

In this context, in a conventional configuration and method shown in FIG. 14 and FIG. 15, a step-up and step-down DC/DC converter with an optional step-up ratio of one to two times or with a step-down ratio of one time or less is suggested (refer to Patent Document 4 JP 2005-224060A). Switches in the DC/DC converter shown in FIG. 14, from a first switch SW1 to a fourth switch SW4, respectively serve as an element of IGBT part 1 which includes a flywheel diode D1 and D2 and of IGBT part 2 which includes a flywheel diode D3 and D4. This DC/DC converter selectively makes functional an inductor L and a plurality of capacitors, C1 and C2, by making ON/OFF control of four switches, from SW1 to SW4, according to mode of operation and operates in any mode of operation out of step-up, continuity, and regeneration (step-down).

Step-up mode will be explained. First, refer to FIGS. 14A and 14B, a charging operation of capacitor C2 is explained. At a time t1, when a gate voltage is applied to switch SW2 in IGBT part 1 and subsequently the switch is turned ON (other switches, the switch SW1, the switch SW3 and the switch SW4, are all OFF), a charging current I1 flows through a route of a power supply E, an inductor L, the switch SW2, a capacitor C2, a flywheel diode D4 and the power supply E. This time, the capacitor C2 is charged by the power supply E (I1 in FIG. 14B: refer to C2 charging current waveform). Then, magnetic energy is accumulated in the inductor L. Simultaneously, as the capacitor C1 and C2 are connected to the capacitor C3 and a load R, the capacitor C3 is charged and an output current flows through the load R.

Next, at a time t2, the switch SW2 is turned OFF (other switches, the switch SW1, the switch SW3 and the switch SW 4, are all OFF), a charging current I2 flows through a route of the inductor L, a flywheel diode D1, the capacitor C1, the capacitor C2, the flywheel diode D4 and the power supply E (I2 of FIG. 14B: refer to L flywheel current waveform).

Consequently, a charging operation of the capacitor C1 will be explained by referring to FIGS. 14C and 14D. When a gate voltage is applied to the switch SW3 in the IGBT part 2 and the switch SW3 is turned ON, (other switches, the switch SW1, the switch SW2 and the switch SW4, are all OFF) a charging current I3 flows through a route of the power supply E, the inductor L, the flywheel diode D1, the capacitor C1, the switch SW3 and the power supply E. This time, the capacitor C1 is charged by the power supply (I3 of FIG. 14D: refer to C1 flywheel current waveform). Then, magnetic energy is accumulated in the inductor L. Then, simultaneously, as the capacitor C1 and C2 are connected to the capacitor C3 and the load R, the capacitor C3 is charged and the output current flows through the load R.

Next, at a time t4, when the switch SW3 is turned OFF (other switches, the switch SW1, the switch SW2 and the switch SW4, are all OFF), a charging current I4 brought by the magnetic energy accumulated in the inductor L flows through a route of the inductor L, the flywheel diode D1, the capacitor C1, the capacitor C2, the flywheel diode D4, and the power supply E (I4 of FIG. 14D: refer to L flywheel current waveform).

In this context, a step-up operation can be carried out by alternately flowing the charging current (I1 and I3) from the capacitor C1 and C2 to the power supply E, accumulating the magnetic energy in the inductor L with the charging a current (I1 and I3) into the capacitor C1 and C2, and charging the capacitor C1 and C2 with the flywheel current (I2 and I4) of the inductor L.

In this conventional DC/DC converter, as shown in FIG. 14E, an ON-time duty ratio of each switch SW2 and SW3 is assumed to be 0 to 50 percent or less. That is, considering dead time to avoid short circuit between the switch SW2 and the switch SW3, these switches are turned ON/OFF while a duty ratio is 50 percent or less, for example, with a duty ratio of 45 percent or the like. This enables an input voltage to be output at an optional step-up ratio of one to two times.

Next, an operation of step-down mode (regenerative mode) as to a conventional DC/DC converter will be explained. For example, when a motor and the like is used as a load on an output side, a cycle of the motor is controlled to decelerate (regenerative braking operation), a voltage on the output (load) side is increased, a power supply such as a battery and the like on the input side can be charged by stepping down the voltage on the output (load) side (by returning energy to the input side).

FIG. 15 shows an operation when a step-down ratio is low (approximately from 0.8 to 1 times, a regenerative load is light). when a step-down ratio is low (approximately from 0.8 to 1 times), for example, a voltage ratio applied to a regenerative power supply Eg (a voltage at the output part) and to a load Rg (a power supply of DC power supply input part) shown in FIG. 15 (a) is approximately from 1:0.8 to 1:1, a step-down operation is carried out by making ON/OFF control of the switch SW1 only, while the switch SW2 and the switch SW3 are turned OFF and the switch SW4 is ON at all the times.

A step-down operation of voltage as to the conventional DC/DC converter will be explained. First, at a time t1 shown in FIG. 15B, when the switch SW1 is turned ON, a charging current I1 flows through a route of the capacitor C1, the switch SW1, the inductor L, the capacitor C4, the switch SW4, and the capacitor C2. The load Rg (a power supply of DC power supply input part) is charged as the capacitor C4 is parallel-connected with the load. Further, this time, magnetic energy is accumulated in the inductor L in FIG. 15B: refer to charging current waveform of C1 and C2).

Next, at a time t2, as the switch SW1 is turned OFF, a charging current I2 brought by the magnetic energy accumulated in the inductor L flows through a route of the inductor L, the capacitor C4, the flywheel diode D3, and the flywheel diode D2 (I2 in FIG. 15B: refer to L charging current waveform).

In this context, when a step-down ratio is low (approximately from 0.8 to 1 times, a regenerative load is light), regeneration is carried out only by making ON/OFF control of the switch SW1. Subsequently, as shown at the lowest bottom of FIG. 15B, only when an electric charge is released from the capacitor C1 and C2, which are connected in series, and only when energy accumulation of the inductor L is released, an output current iL flows through the capacitor C4 on the input side. As a result, the output current iL is turned into an interrupted current and is eventually interrupted. Then, in this conventional example, as an operation in the case of a high step-down ratio (0.8 times or less) is different from an operation in the case of a low step-down ratio (0.8 times or more), it is difficult to make a step-down ratio variable while maintain a continuity of the step-down ratio.

As for configuration and method of the conventional DC/DC converter described in above FIG. 14 and FIG. 15, the number of a plurality of capacitors, C1 and C2, is required to increase, three or more in number, in order to achieve a step-up ratio of two times or more. For this reason, circuit configuration gets complicated. Further, as for the configuration of the conventional DC/DC converter described above, when a step-down ratio is low (0.8 to 1 times), there is a problem that an output current iL is turned into an interrupted current and is eventually interrupted. Moreover, as an operation in a case of a high step-down ratio (0.8 times or less) is different from an operation in a case of a low step-down ratio (0.8 times or more), it is impossible to make a step-down ratio variable in succession. Further, there is another problem that when a step-down ratio is considerably near to one time, a step-down operation is not efficient, similar to a step-down operation of a conventional L-type whose inductance is extremely low.

SUMMARY OF THE INVENTION

The present invention takes these problems into consideration. It is an object of the present invention to provide an electric power converter suitable for a step-up and/or step-down DC/DC converter which is small in size, lightweight, reasonable, and which enables a step-up ratio of two times or more even if the number of capacitors is two, and which allows to perform a continuous step-down operation without interrupting an output current even if a step-down ratio is low, and efficiently converts a voltage even if a step-down ratio is near to one time.

In order to solve the foregoing problems, as for the DC/DC converter disclosed in Patent Document 4 JP 2005-224060A, the present invention provides the electric power converter having a configuration wherein a period when a plurality of switches are simultaneously turned ON is set up.

Conventionally, as mentioned above, it has been considered that simultaneously turning ON a plurality of switches should be avoided because it causes a condition of short circuit. Moreover, merely simultaneously turning the plurality of switches only increases a current and fails to efficiently increase its frequency. However, as for the DC/DC converter disclosed in Patent Document 4 JP 2005-224060A by the inventors of the present invention, findings are such that, when a duty ratio of a plurality of switches is set over 50 percent, and a period when a plurality of switches are simultaneously turned ON at the ends of a period of alternately turning a plurality of switches ON/OFF is set up, in step-up mode, a step-up ratio of two times or more is gained on the output side even if the number of capacitors is two. On the other hand, in step-down mode, it is possible to make a step-down ratio variable in succession without interrupting an output current even if the step-down ratio is low, and to efficiently convert voltage even if the step-down ratio is near to one time.

Therefore, the electric power converter of the present invention comprises a first input-output part, an inductor connected with a positive electrode or a negative electrode of the input-output part, a plurality of switches, a plurality of capacitors, a second input-output part connected with a plurality of capacitors, and a control circuit part, wherein the control circuit part makes ON/OFF control of the plurality of switches in accordance with mode of operation and makes the inductor and the plurality of capacitors selectively functional, and the electric power converter is of switched capacitance type that carries out any operation out of step-up, step-down, regeneration, and continuity, and wherein the control circuit part controls in a such way that a period when two switches out of the plurality of switches are simultaneously turned ON is set up.

According to the above configuration, in step-up mode, when the plurality of switches are alternately turned ON/OFF (for example, the switch SW2 and SW3 shown in FIG. 1), control is made in a such way that a period when a plurality of switches are simultaneously turned ON is set up. During this period of simultaneously turning ON the plurality of switches, a large amount of current passes through the inductor (for example, the inductor L shown in FIG. 1) and magnetic energy is accumulated. Thereafter, a plurality of switches are controlled ON/OFF. Then, a plurality of capacitors (for example, the capacitor C1 and C2 shown in FIG. 1) can be alternately charged by a large amount of flywheel current from this inductor. As a result, a voltage with a step-up ratio of two times or more can be generated at the second input-output part.

In step-down mode (or regenerative mode), when a plurality of switches (for example, the switch SW1 and SW4 shown in FIG. 1) are alternately turned ON/OFF, control is made in a such way that a period when the plurality of switches are simultaneously turned ON is set up. During this period of simultaneously turning ON the plurality of switches, a regenerative voltage from a regenerative power supply connected with the second input-output part or a regenerative voltage accumulated in the plurality of capacitors, C1 and C2, is applied to the inductor. Magnetic energy is accumulated and a flywheel current passes through this inductor. Then, a sufficient amount of output current is generated and a range of variation (ripple) of the output current narrows. Therefore, noise reduction can be effectively done. Then, a frequency of a current passing through the inductor increases (approximately twofold). Consequently, a pause and intermittence of the output current can be avoided. Then, a step-down operation can be efficiently carried out even if a step-down ratio is near to one time. Then, a step-down ratio in a range of zero to one times and a step-up ratio in a range of one to two times can variably be adjusted in succession only by changing a duty ratio of a gate voltage.

In electrical continuity mode, a plurality of switches (for example, the switch SW1 to SW4 shown in FIG. 1), all of them, are controlled OFF. A voltage of the first input-output part connected to a DC power supply is output to the second input-output part as it is.

Then, the electric power converter of the present invention comprises a first input-output part, first and second capacitors connected in series, a second input-output part connected with the first and second capacitors, an inductor connected with a positive electrode side or a negative electrode side of the first input-output part, a first switch connected the positive electrode side of the first input-output part with the positive electrode side of the first capacitor and the positive electrode side of the second input-output part, a second switch connected the positive electrode side of the first input-output part with the negative electrode side of the first capacitor and the positive electrode side of the second capacitor, a third switch connected the negative electrode side of the first input-output part with the negative electrode side of the first capacitor and the positive electrode side of the second capacitor, a fourth switch connected the negative electrode side of the first input-output part with the negative electrode side of the second capacitor and the negative electrode side of the second input-output part, and a control circuit part that controls ON/OFF the switches, from the first switch to the fourth switch. In step-up mode, a period of alternately turning ON/OFF the second and third switches and a period of simultaneously turning ON the second and third switches are set up. In step-down mode, a period of alternately turning ON/OFF the first and fourth switches and a period of simultaneously turning ON the first and fourth switches are set up.

According to the above configuration, in step-up mode, when the second and third switches alternately turn ON/OFF, control is made in a such way that a period of simultaneously turning ON is set up. During this period of simultaneously turning ON, a large amount of current passes through the inductor (for example, the inductor L shown in FIG. 1) and magnetic energy is accumulated. Thereafter, the second and third switches are alternately controlled ON/OFF. Then, a plurality of capacitors (for example, the capacitor C1 and C2 shown in FIG. 1) are alternately charged by a large amount of flywheel current from this inductor. As a result, a voltage with a step-up ratio of two times or more can be generated at the second input-output part.

In step-down mode, when the first and fourth switches are alternately turned ON/OFF, control is made in a such way that a period of simultaneously turning ON is set up. During this period of simultaneously turning ON, a regenerative voltage from a regenerative power supply and/or a regenerative voltage accumulated in the first and second capacitors, C1 and C2, is applied to the inductor L. As a result, a sufficient amount of output current is generated and a range of variation (ripple) of the output current narrows. Therefore, noise reduction can be effectively carried out. Then, a frequency of a current passing through the inductor L increases. At a time of step-down mode (at a time of regenerative mode), a pause and intermittence of the output current can be avoided. Then, a step-down operation can be efficiently performed even if a step-down ratio is near to one time. Then, the step-down ratio can variably be adjusted in succession only by changing a duty ratio of a gate voltage.

Further, a step-up electric power converter of the present invention comprises an input part, first and second capacitors connected in series, an output part connected with the first and second capacitors, an inductor connected with a positive electrode side or a negative electrode side of the first input part, a first switch connected the positive electrode side of the input part with the negative electrode side of the first capacitor and the positive electrode side of the second capacitor, a second switch connected the negative electrode side of the input part with the negative electrode side of the first capacitor and the positive electrode side of the second capacitor, a control circuit part that controls ON/OFF the first and second switches, wherein the control circuit part controls in a such way that, at a time of step-up mode, the first and second switches are alternately switched ON or OFF, and when alternately turning ON/OFF, a simultaneous ON period when the first and second switches are simultaneously turned ON is set up.

According to the above configuration, in the present invention, during the simultaneous ON period when the first and second switches are simultaneously turned ON, a large amount of current passes through the inductor (for example, the inductor L shown in FIG. 1) and magnetic energy is accumulated. Thereafter, by control of alternately turning ON/OFF the first and second switches, a large amount of flywheel current from this inductor, through the inductor from the input part, adds to a charging current which charges the first or second capacitors (for example, the capacitor C1 and C2 shown in FIG. 1). As a result, a voltage with a step-up ratio of two times or more can be generated at the output part.

And a step-down electric power converter of the present invention comprises an output part, first and second capacitors connected in series, an input part connected with the first and second capacitors, an inductor connected with a positive electrode side or a negative electrode side of the output part, a first switch connected the positive electrode side of the output part with the positive electrode side of the first capacitor and the positive electrode side of the input part, a second switch connected the negative electrode side of the output part with the negative electrode side of the second capacitor and the negative electrode side of the input part, a control circuit part that controls ON/OFF the first and second switches, wherein the control circuit part controls in a such way that, at a time of step-down mode, the first and second switches are alternately switched ON or OFF, and when alternately turning ON or OFF, a simultaneous ON period when the first and second switches are simultaneously turned ON is set up.

According to the above configuration, during the simultaneous ON period, a regenerative electric power accumulated in the first and second capacitors (for example, the capacitor C1 and C2 shown in FIG. 1) and/or a regenerative electric power from a regenerative power supply can be applied to the inductor (for example, the inductor L shown in FIG. 1). As a result, a sufficient amount of output current is generated at the output part and a range of variation (ripple) of the output current narrows. Therefore, noise reduction can be effectively carried out. At a time of step-down mode (at a time of regenerative mode), a pause and intermittence of the output current can be avoided even if a step-down ratio is low. Then, a step-down operation can be efficiently performed even if a step-down ratio is near to one time. Then, the step-down ratio can variably be adjusted in succession only by changing a duty ratio of a gate voltage.

As for the electric power converter of the present invention, at a time of step-up mode, a plurality of switches are simultaneously turned ON, magnetic energy is accumulated by flowing a large amount of current through an inductor, subsequently, a plurality of capacitors (for example, the capacitor C1 and C2 shown in FIG. 1) are charged with a flywheel current from the inductor by alternately turning ON/OFF the plurality of switches. Therefore, two capacitors successfully makes a step-up ratio of two times or more variable and continuous. Basically, as a step-up operation can be achieved by a build-up effect of voltage brought by the two capacitors, the inductor used for current control is greatly smaller (for example, 20 microhenry) in size than a conventional type (refer to Patent Document 1 JP 2006-271101A). In other words, the present invention successfully realizes downsizing, weight reduction, and lower prices of a DC/DC converter. At a time of a reverse step-down operation, the inductor serves as an inductor used for a step-down voltage converter and allows a regenerative reverse step-down operation.

Then, as for the electric power converter of the present invention, at a time of step-down mode (at a time of regenerative mode), a plurality of switches are simultaneously turned ON/OFF, regenerative electric power accumulated in a plurality of capacitors and/or regenerative electric power from a regenerative power supply is applied to the inductor, then, magnetic energy is accumulated. As a result, a sufficient amount of output current is generated at the output part and a range of variation (ripple) of the output current narrows. Therefore, noise reduction can be effectively carried out. Further, as a peak value of a current goes down, a small switching element can be selected. A frequency of a current flowing through the inductor increases. A pause and intermittence of the output current can be avoided even if a step-down ratio is low. A step-down operation of voltage is efficiently made even if a step-down ratio is considerably near to one time. A step-down ratio can variably be adjusted in succession in only by changing a duty ratio of a gate voltage of a switch.

Consequently, as for the step-up and step-down electric power converter of the present invention, a ratio of an input voltage to an output voltage can variably be adjusted in succession in a range of one to two times or more.

BRIEF DESCRIPTION OF THE DRAWINGS

FIGS. 2A to 2C illustrate a configuration diagram for a step-up operation as for the step-up and step-down DC/DC converter of the electric power converter shown in FIG. 1.

FIGS. 6A to 6D are diagrams showing a step-up operation with a step-up ratio of two times or more as for the step-up and step-down DC/DC converter of the present invention shown in FIG. 2.

FIGS. 7A to 7D are diagrams showing a step-down operation with a high step-down ratio (0 to 0.5 times) as for the step-up and step-down DC/DC converter of the present invention shown in FIGS. 3A and 3B.

FIGS. 8A to 8D are diagrams showing a principle of operation with a low step-down ratio (0.5 to 1 times) as for the electric power converter of the present invention.

FIGS. 9A to 9C are diagrams showing a step-down operation with a low step-down ratio (0.5 to 1 times) as for the step-up and step-down DC/DC converter of the present invention shown in FIGS. 3A and 3B.

FIGS. 10A to 10C are diagrams showing a waveform measurement for each part at a time of a step-up operation as for the concrete step-up and step-down DC/DC converter circuit in the first embodiment of the present invention.

FIGS. 12A to 12C are diagrams showing a step-up DC/DC converter circuit of the electric power converter in another embodiment of the present invention.

FIGS. 14A to 14E are diagrams showing a step-up operation of a conventional step-up and step-down DC/DC converter.

DETAILED DESCRIPTION OF PREFERRED EMBODIMENTS

Next, the best mode to carry out the present invention will be explained with reference to drawings.

Figure 1:
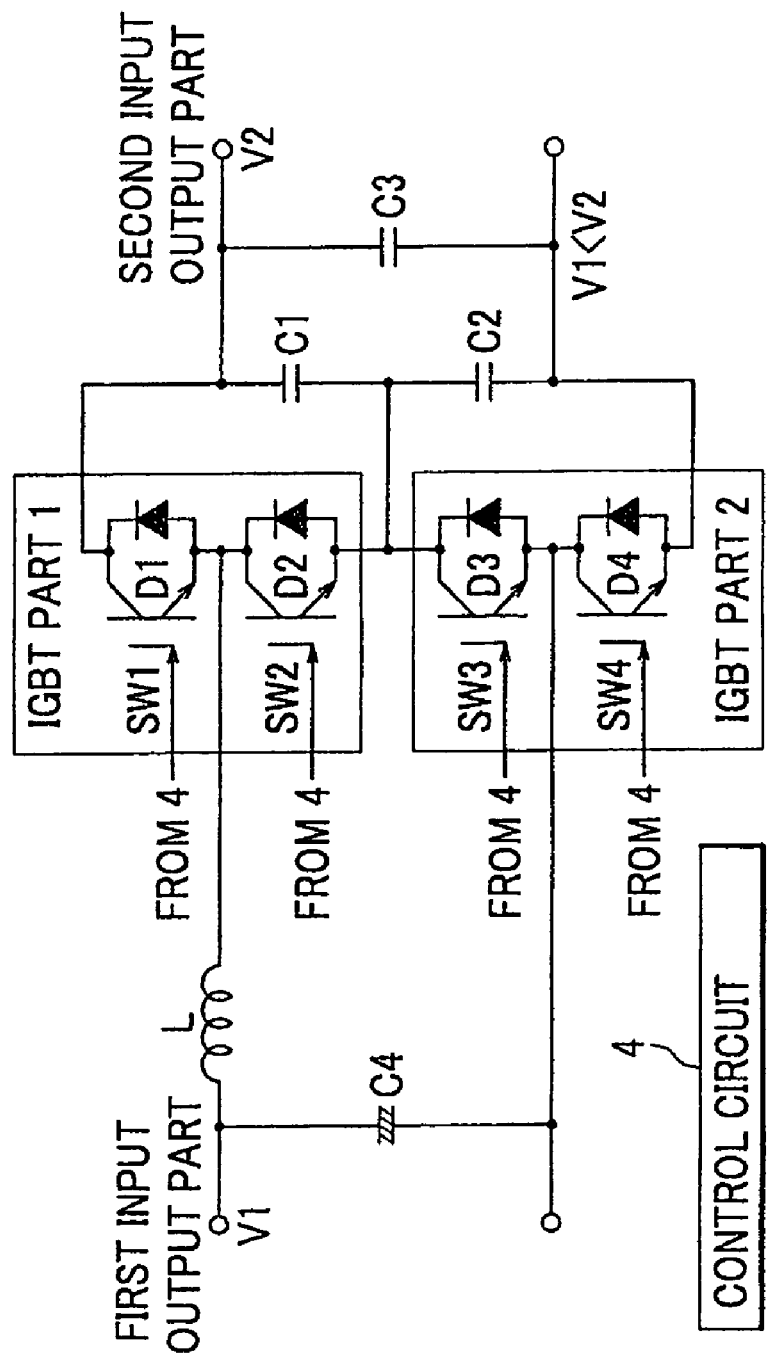
FIG. 1 illustrates a circuit diagram of a step-up and step-down DC/DC converter of an electric power converter according to a first embodiment of the present invention.

FIG. 1 shows a circuit diagram for a DC/DC converter which is a step-up and step-down electric power converter in a first preferred embodiment of the present invention. The DC/DC converter of the preferred embodiment includes step-up mode (for example, a power supply voltage of a DC power input part can be stepped up one to two times or more), electrical continuity mode, regenerative mode (a step-up operation can be made with a step-up ratio of zero to one times).

Figure 15A:
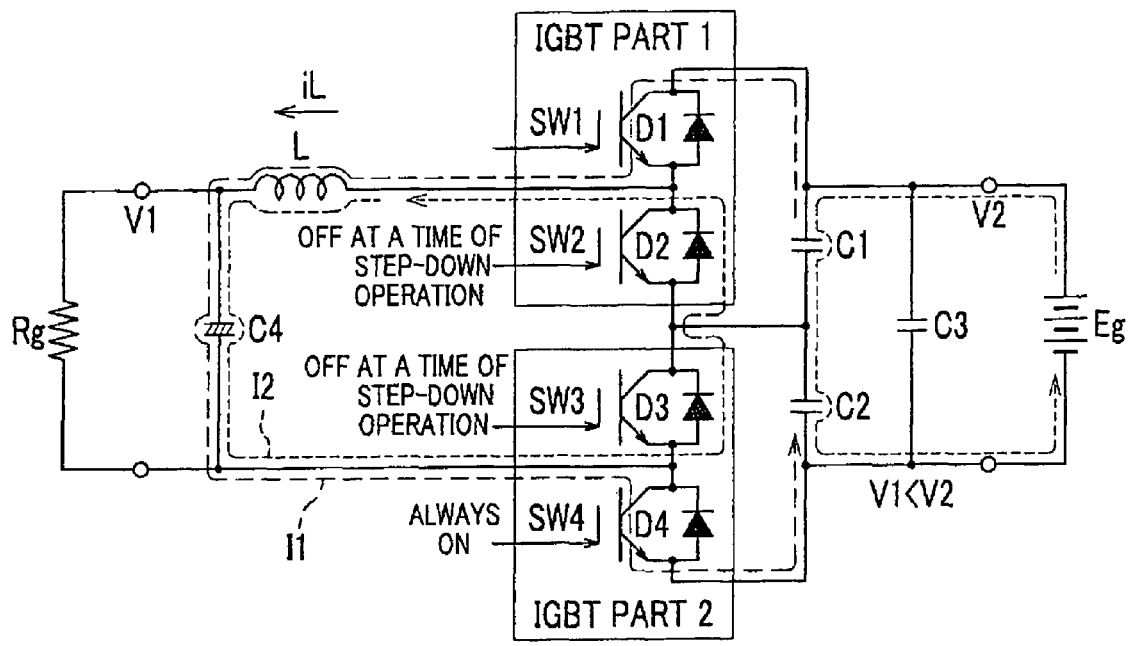
FIGS. 15A and 15B are diagrams showing a step-down operation of the conventional step-up and step-down DC/DC converter.
Figure 15B:
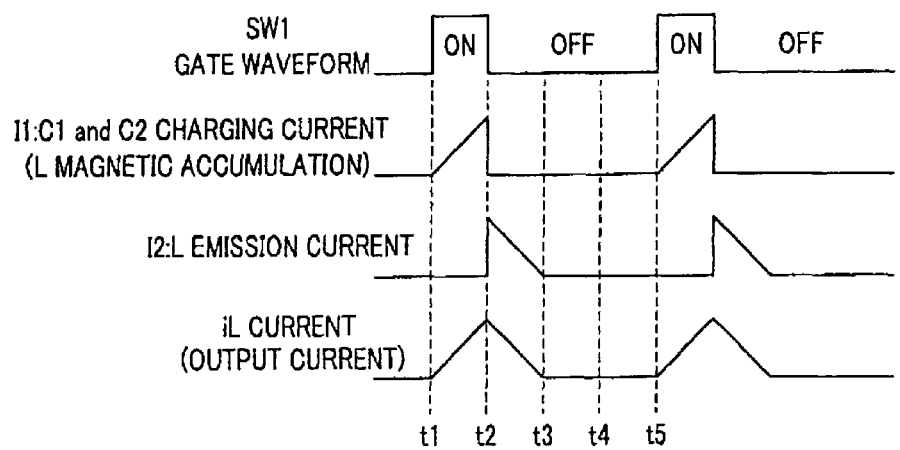

The difference between the DC/DC converter in the preferred embodiment shown in FIG. 1 and the DC/DC converter disclosed in Patent Document 4 JP 2005-22406A described above by referring to FIG. 14 and FIG. 15 as a conventional example lies in a method for ON/OFF control of a plurality of switches. That is, except for the control circuit part 4 which controls turning ON/OFF a plurality of switches, a circuit configuration in the preferred embodiments shown in FIG. 1 is basically identical to the circuit configuration shown in FIG. 14 and FIG. 15 in Patent Document 4 JP 2005-224060A as conventional examples described above.

The DC/DC converter in the preferred embodiment shown in FIG. 1 includes a smoothing capacitor C4 connected in parallel with a positive electrode side and a negative electrode side of the first input-output part (voltage V1), an inductor L connected with the positive electrode side of the first input-output part, a IGBT part 1 and 2 which have two (a pair of)

IGBT elements built-in, and a capacitor C1, C2 and C3 on a side of the second input-output part (voltage V2). Then, the capacitor C1, C2 and C3 are a film capacitor. (The smoothing capacitor C4 is installed to decrease impedance of voltage. For example, when power supply is away from a circuit part and a length of electric wiring increases, the impedance of voltage increases and brings a risk of malfunction of control. However, an electrolytic capacitor C4 prevents this. In FIG. 1, although the smoothing capacitor C4 is indicated as a chemical capacitor, a film capacitor is allowed in the present invention.)

The capacitor C1 and the capacitor C2 are connected in series. The capacitor C3 is connected in parallel with the capacitor C1 and the capacitor C2. The positive electrode side of the capacitor C1 and the positive electrode side of the capacitor C3 is connected with the positive electrode side of the second input-output part. The negative electrode side of the capacitor C2 and the negative electrode side of the capacitor C3 is connected with the negative electrode side of the second input-output part.

The first input-output part and the second input-output part respectively operate as an input part and an output part at a time of an operation of step-up mode. Roles of the first input-output part and the second input-output part are exchanged in an operation of step-down (regenerative) mode. That is, the first input-output part and the second input-output part respectively operate as the output part and the input part in an operation of step-down (regenerative) mode.

An IGBT element and a flywheel diode D1 at a top of the IGBT part 1 correspond to the switch SW1, an IGBT element and a flywheel diode D2 at a bottom of the IGBT part 1 correspond to the switch SW2, An IGBT element and a flywheel diode D3 at a top of the IGBT part 2 correspond to the switch SW3, and an IGBT element and a flywheel diode D4 at a bottom of the IGBT part 2 correspond to the switch SW4.

The switch SW1 is placed between the inductor connected with the positive electrode side of the first input-output part and the positive electrode side of the capacitor C1 and controls ON/OFF in a route between the inductor L and the capacitor C1. The switch SW2 is placed between the inductor L connected with the positive electrode side of the first input-output part, the negative electrode side of the capacitor C1, and the positive electrode side of the capacitor C2 and controls ON/OFF in a route between the first input-output part, the capacitor C1 and the capacitor C2. The switch SW3 is placed between the negative electrode side of the first input-output part, the negative electrode side of the capacitor C1 and the positive electrode side of the capacitor C2 and controls ON/OFF in a route between the first input-output part, the capacitor C1 and the capacitor C2. The switch SW4 is placed between the negative electrode side of the first input-output part and the negative electrode side of the capacitor C2 and controls ON/OFF in a route between the first input-output part and the capacitor C2.

The control circuit part 4 respectively supplies to a gate of each switch with a gate voltage used for ON/OFF control of a plurality of switches, SW1, SW2, SW3, and SW4. The difference between the control circuit part 4 in the preferred embodiments and the control circuit part disclosed in Patent Document 4 JP 2005-224060A lies in a magnitude of ON/OFF duty ratio of a plurality of switches, SW1, SW2, SW3, and SW4, which the control circuit part 4 controls. Other features of the control circuit part 4 are identical to those of the control circuit part disclosed in Patent Document 4 JP 2005-224060A.

FIGS. 2A and 2B show a condition of the DC/DC converter in a step-up operation in the preferred embodiment shown in FIG. 1. Namely, as shown in FIG. 2A, the first input-output part serves as an input part and is connected with a power supply E, the second input-output part serves an output part and is connected with a load R. Subsequently, the switch SW1 and switch SW4 are always turned OFF, the switch SW2 of the IGBT part 1 and the switch SW3 of the IGBT part 2 are alternately turned ON and OFF.

When a step-up ratio of two times or more, which is a feature of the present invention, is set, a simultaneous ON period when switch SW2 and SW3 are simultaneously turned ON at the both ends of a period of alternately turning ON/OFF switch SW2 and SW3 is set, wherein the gate voltage waveform provided with the control circuit part 4 is shown as gate voltage waveforms of switch SW2 and SW3 in FIG. 2C.

That is to say, in a simultaneous ON period, the gate voltage waveform of the switch SW2 and the gate voltage waveform of the switch SW3 are overlapped with each other. In other words, this is called "being lapped". For this reason, a duty ratio of each gate voltage is over 50 percent of one cycle. This is applied to a gate voltage shown in the preferred embodiments when the step-up ratio is two times or more. The gate voltage is provided with the control circuit part 4.

Then, if the step-up ratio ranges from one to two times, as shown in FIG. 2B, like the conventional examples referred and explained in FIG. 14, control is made in a such way that the gate voltage waveform provided with the control circuit part 4 changes during a period when ON-time duty ratios of each switch SW2 and SW3 range from 0 to 50 percent or less, an input voltage is consecutively stepped up zero to two times and is output. When the duty ratio is 50 percent, the step-up ratio doubles.

Figure 3A:
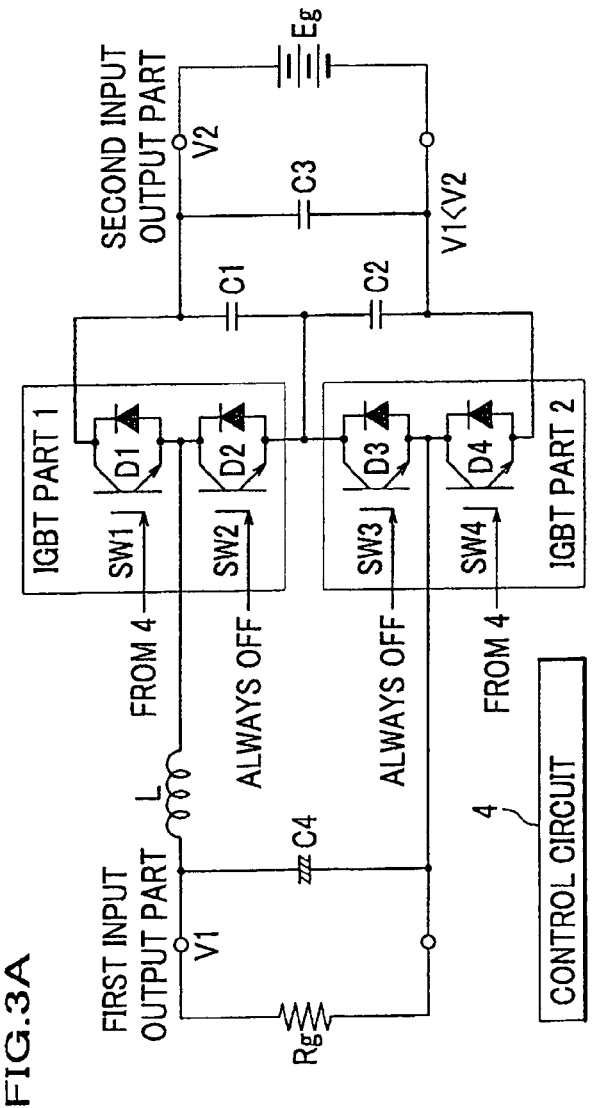
FIGS. 3A to 3C illustrate a configuration diagram for a step-down operation as for the step-up and step-down DC/DC converter of the electric power converter shown in FIG. 1.
Figure 3B:
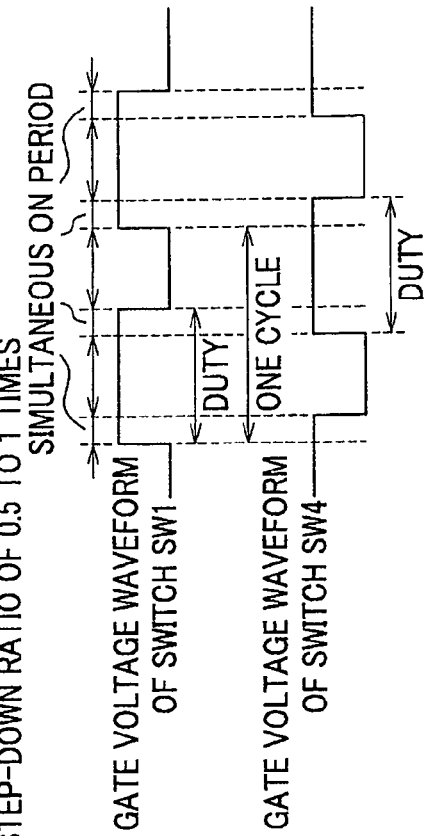

FIGS. 3A and 3B show the DC/DC converter of the present invention shown in FIG. 1 at a time of a step-down operation of voltage. In step-down (regenerative) mode shown in FIGS. 3A and 3B, as electric power from a regenerative side returns to the load Rg (a power supply side), the input part and the output part are replaced, compared to FIGS. 2A and 2B.

In step-down mode (regenerative mode), the switch SW2 and switch SW3 are always OFF, a gate voltage which turns ON/OFF the switch SW1 of the IGBT part 1 and the switch SW4 of the IGBT part 2 is supplied from the control circuit part 4.

FIG. 3B shows a gate voltage which carries out an ON/OFF operation of the switch SW1 and SW4 when a step-down ratio is high (0 to 0.5 times). When a step-down ratio is high (0 to 0.5 times), the gate voltage is changed during a period when ON-time duty ratios of each switch SW1 and SW4 are held 0 to 50 percent or less. A voltage (a regenerative voltage V2) of the regenerative power supply Eg is output across the load Rg as a voltage V1, wherein a step-down ratio goes down 0 to 0.5 times.

Figure 3C:
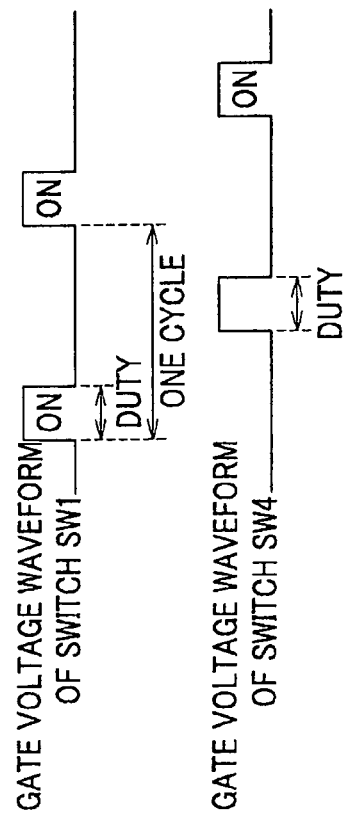

FIG. 3C shows a gate voltage which performs an ON/OFF operation of the switch SW1 and SW4 when a step-down ratio is low (0.5 to 1 times). In case the step-down ratio is low (0.5 to 1 times), a gate voltage is supplied with the control circuit part 4 by means of setting up an ON period when the switch SW1 and SW4 are simultaneously turned ON at the both ends of a period of alternately turning ON/OFF the switch SW1 and SW4. That is, a gate voltage waveform of the switch SW1 and a gate voltage waveform of the switch SW4 are overlapped with each other on their edges. In other words, the waveforms are "being lapped". The simultaneous ON-time has been set up. Therefore, a duty ratio of each gate voltage is over 50 percent.

If a duty ratio of each gate voltage is set 100 percent, the switch SW1 and SW4 are always turned OFF and the input part and the output part shown in a circuit of FIG. 3A are connected. As a result, the step-down ratio becomes one time. Consequently, a step-down operation of voltage can be efficiently made even if the step-down ratio is near to one time. If the duty ratio is 50 percent, the step-down ratio is ½ (0.5 times). Thus, the step-up ratio can be adjusted in a range of 0.5 to 1 times by changing the duty ratio. Then, as noted FIG. 3B and FIG. 3C, a step-down ratio can variably be adjusted in succession in a range of zero to one times only by changing a duty ratio of the gate voltage of a switch.

Figure 4A:
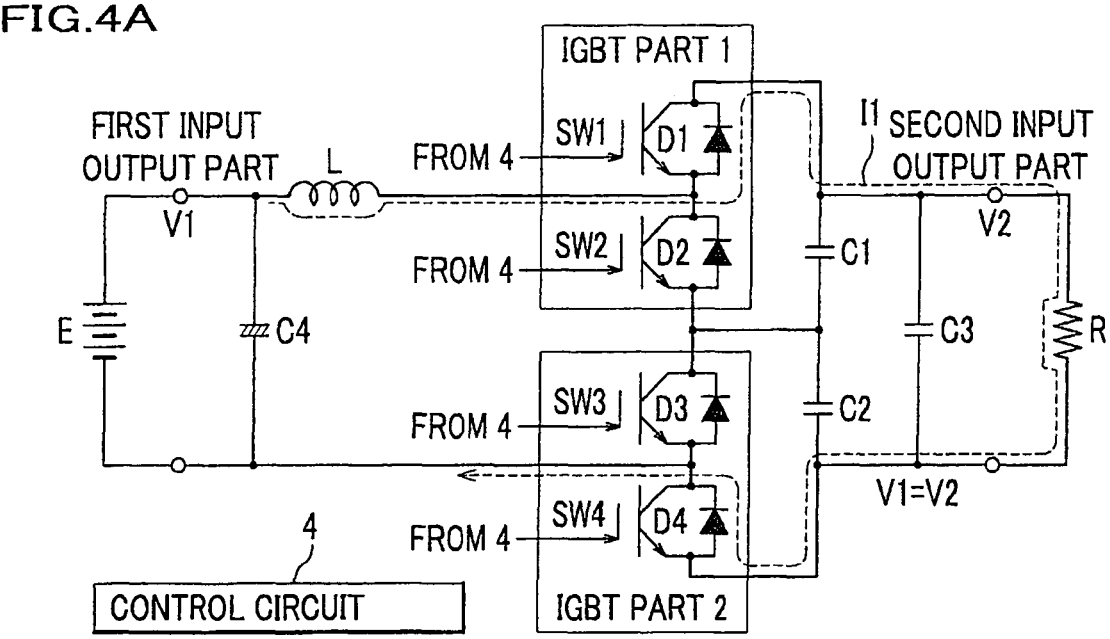
FIGS. 4A and 4B illustrate a configuration diagram for an operation as a rectifier circuit (step-up voltage circuit of one time) as for the step-up and step-down DC/DC converter of the electric power converter shown in FIG. 1.
Figure 4B:
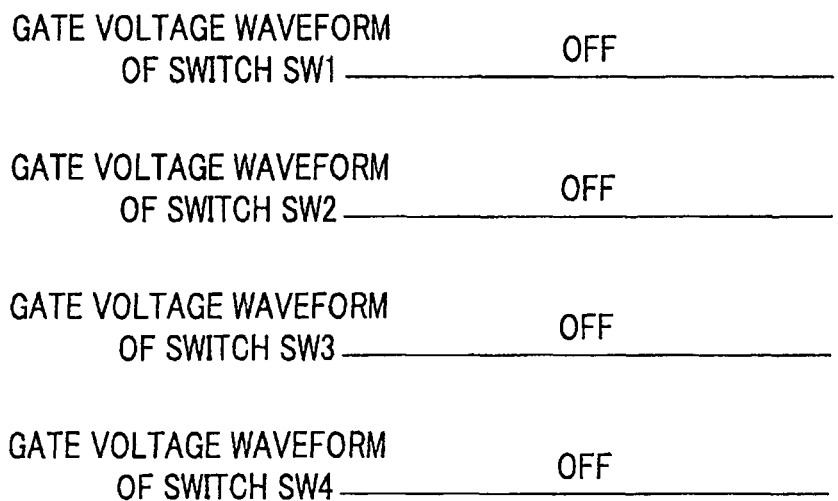

FIGS. 4A and 4B show a configuration wherein the DC/DC converter of the preferred embodiments shown in FIG. 1 functions as a rectifier circuit (electrical continuity circuit). SW1, SW2 SW3 and SW4 are always turned OFF by the control circuit part 4 and a normal rectifier circuit is operated (electrical continuity circuit: one, time step-up voltage circuit). When the switches, from SW1 to SW4, stop switching, a current I flows through the load R in a current route of the power supply E, the inductor L, the flywheel diode D1 in the IGBT part 1, the load R, the flywheel diode D4. In this case, the capacitor C1 and C2 are not necessarily contributing to stepping up a voltage, an output voltage is approximately one time an input voltage.

Consequently, as for the DC/DC converter of the preferred embodiments, each operation of step-up and step-down (re-generative) will be explained in detail.

[Step-Up Mode]

[In Case a Step-Up Ratio is Two Times or More]

First, an operation of step-up mode with a step-up ratio of two times or more, which is a feature of the present invention, will be explained by referring to FIGS. 5A to 5D. As described above, in a step-up operation of voltage, the switch SW1 and SW4 are always turned OFF. Then, the switch SW1, the flywheel diode D1 of the switch SW4 and the flywheel diode D4 allow a current of forward direction to flow. Therefore, a circuit element which is not related to a flow of current in the step-up operation of voltage is omitted from FIGS. 5A to 5D.

Figure 5B:
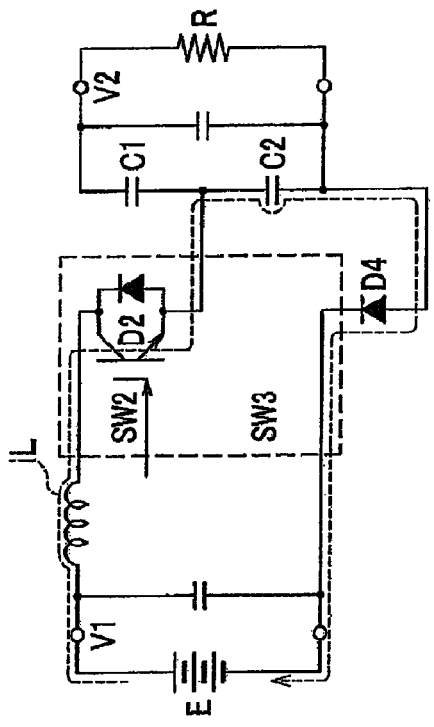
FIGS. 5A to 5D are diagrams showing a principle of operation with a step-up ratio of two times or more as for the electric power converter of the present invention.
Figure 5D:
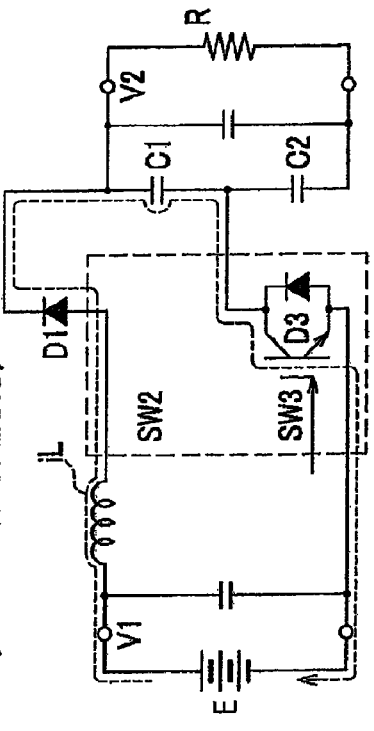
Figure 5A:
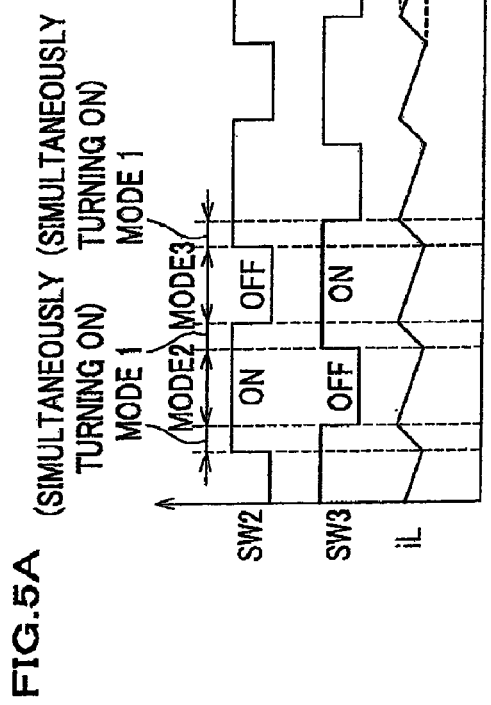

FIG. 5A shows a gate voltage waveform of the switch SW2 and the switch SW3 brought by the control circuit part (2 in FIG. 2) like in FIG. 2C. A current iL passing the inductor L is shown at the lowest bottom of FIG. 5A. In the present invention, in order to achieve a step-up ratio of two times or more, a simultaneous ON-time period when the switch SW2 and SW3 are simultaneously turned ON is set up. That is, the gate voltage waveform of the switch SW2 and the gate voltage waveform of the switch SW3 are overlapped with each other on their edges. A duty ratio of each gate voltage is over 50 percent of one cycle.

In FIGS. 5A to 5D, a simultaneous ON-time period when a second switch SW2 and a third switch SW3 are simultaneously turned ON is regarded as mode 1. A period when the second switch SW2 is turned ON and the third switch SW3 is turned OFF is regarded as mode 2. A period when the second switch SW2 is turned OFF and the third switch SW3 is turned ON is regarded as mode 3.

As noted in FIG. 5A, in time sequence, mode changes in the order of mode 1, mode 2, mode 1, mode 3, mode 1, and mode 2. That is, the control circuit part 4 (FIG. 2) controls each gate voltage waveform of the second switch SW2 and the third switch SW3 by means of interposing mode 1, wherein the second switch SW2 and the third switch SW3 are simultaneously turned ON, between mode 2 and mode 3, wherein the second switch SW2 and the third switch SW3 are alternately controlled ON/OFF.

[Simultaneous ON-Time Period]

Figure 5C:
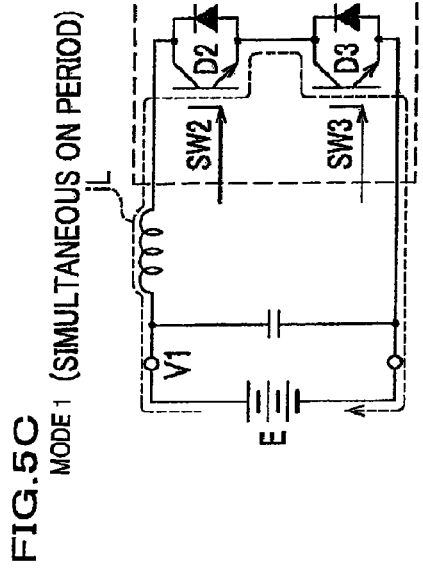

First, mode 1 will be explained. In mode 1, as shown in FIG. 5C, the switch SW2 and the switch SW3 are simultaneously turned ON. A current flows in a route of the input power supply E, the inductor L, the switch SW2, the switch SW3 and the input power supply E. In this case, as impedance in a current route between the input power supply E and the inductor L becomes low, an increase in the current iL passing the inductor L is high. When inductance value of the inductor L is applied to about 20 microhenry shown in the conventional example of FIG. 14, a rate of increase in a current in mode 1 is almost same as that of the conventional example shown in FIG. 14. Magnetic energy brought by this large amount of current is accumulated in the inductor L.

[C2 Charging Period]

In next mode 2, As shown in FIG. 5B, the switch SW2 is turned ON, the switch SW1, the switch SW3 and the switch SW4 are turned OFF. A charging current for the capacitor C2 from the input power supply flows in a route of the input power supply E, the inductor L, the switch SW2, the capacitor C2, the flywheel diode D4 of the switch SW4, and the input power supply E. The capacitor C2 is charged. Then, at the same time, the capacitor C2 is charged by a large amount of flywheel currents brought by magnetic energy accumulated in the inductor L.

[Simultaneous ON-Time Period]

In a next mode 1, As shown in FIG. 5C, the switch SW2 and the switch SW3 are simultaneously turned OFF. A current flows in a route of the input power supply E, the inductor L, the switch SW2, the switch SW3, and the input power supply E. Then, as an impedance of the current route becomes low, the current flowing the inductor L is on the increase. When an inductance value of the inductor L is applied to about 20 microhenry shown in the conventional example of FIGS. 14A to 14E, a rate of increase in a current in mode 1 is almost same as that of the conventional example shown in FIGS. 14A to 14E. Magnetic energy brought by this large amount of current is accumulated in the inductor L.

[C1 Charging Period]

In a next mode 3, As shown in FIG. 5D, when the switch SW2 is turned OFF and the switch SW3 is turned ON, as the switch SW1 is OFF, a charging current for the capacitor C1 from the input power supply flows in a route of the input power supply E, the inductor L, the flywheel diode D1 of the switch SW1, the capacitor C1, the switch SW3 and the input power supply E. The capacitor C1 is charged. Then, at the same time, the capacitor C1 is charged by a flywheel current brought by the magnetic energy accumulated in the inductor L.

As described above, the DC/DC converter of the present invention has a step-up operation of voltage, wherein, before the capacitor C1 and C2 are alternately charged by alternately turning a plurality of switches, SW2 and SW3, a simultaneous ON-time period (mode 1) when a plurality of the switches, SW2 and SW3, are simultaneously turned ON is set up, magnetic energy is accumulated by flowing a large amount of currents through the inductor L, the capacitor C1 and C2 are additionally charged when the capacitor C1 and C2 are charged by the flywheel current brought by this magnetic energy. As shown in FIG. 5A, as for the present invention, the current iL flowing the inductor L increases, a range of its variation (ripple |Aripl|) narrows and a frequency of the current doubles. In this context, in the present invention, the capacitor C1 and C2 are sufficiently charged by setting up a period when a plurality of switches are simultaneously turned ON. Therefore, the step-up ratio of two times or more can be achieved.

Next, the step-up mode described above will be explained again with reference to FIGS. 6A to 6D. in which a circuit configuration is equivalent to a counterpart shown in FIGS.

2A and 2B. Then, FIG. 6A shows a circuit operation in mode 1 and mode 3 wherein the capacitor C1 is charged. FIG. 6C shows a circuit operation in mode 1 and mode 2 wherein the capacitor C2 is charged.

As shown in FIG. 6B and FIG. 6D, a simultaneous ON period when the second switch SW2 and the third switch SW3 are simultaneously turned ON is regarded as mode 1, a period when the switch SW2 is turned ON and the switch SW3 is turned OFF is regarded as mode 2 (C2 charging period), a period when the switch SW2 is turned OFF and the switch SW3 is turned ON is regarded as mode 3 (C1 charging period).

[Simultaneously Turning ON]

First, a charging operation of the capacitor C2 will be explained by referring to FIG. 6C and FIG. 6D. At a time T1 shown in FIG. 6D, when a gate voltage is applied to the switch SW2 in the IGBT part 1 and the switch SW2 is turned ON, as a gate voltage has already been applied to the switch SW3 in the IGBT part 2 (mode 1, other switch SW1 and SW4 are OFF), in FIG. 6C, a large amount of currents brought by accumulated magnetic energy flows in a route of the power supply E, the inductor L, the switch SW2, the switch SW3, and the power supply E (i3 in FIG. 6D: refer to L magnetically storing current waveform).

[C2 Charging Operation]

At a time T2, when a gate voltage is applied to the switch SW2 in the IGBT part 1 and the switch SW2 keeps turning ON, an application of a gate voltage for the switch SW3 in the IGBT part 2 is stopped and the switch SW3 is turned OFF (mode 2, other switch SW1 and SW4 are OFF). Then, a charging current flows in a route of the power supply E, the inductor L, the switch SW2, the capacitor C2, the flywheel diode D4, and the power supply E. The capacitor C2 is charged by the power supply E. Concurrently, the capacitor C2 is charged by releasing huge magnetic energy accumulated in the inductor L (i4 in FIG. 6D: refer to C2 charging current waveform).

Then, at the same time, as the capacitor C1 and C2 are connected with the capacitor C3 and the load R, an output current flows through the load R as the capacitor C3 is charged.

[Simultaneously Turning ON]

Next, at a time T3, while the switch SW2 keeps ON and the switch SW3 is turned ON (mode 1, other switch SW1 and the switch SW4 are OFF), charging the capacitor C2 is stopped and a large amount of accumulated currents i1 flows in a route of the power supply E, the inductor L, the switch SW2, the switch SW3, and the power supply E. And huge magnetic energy is accumulated in the inductor L (i1 in FIG. 6B: refer to L magnetically storing current waveform).

[C1 Charging Operation]

Subsequently, a charging operation of the capacitor C1 will be explained with reference to FIG. 6A and FIG. 6B. At a time T4, when a gate voltage is applied to the switch SW3 in the IGBT part 2 and the switch SW3 keeps turning ON, an application of the gate voltage for the switch SW2 in the IGBT part 1 is stopped and the switch SW2 is turned OFF (mode 3, other switch SW1 and SW4 are OFF). Then, a charging current flows in a route of the power supply E, the inductor L, the flywheel diode D1, the capacitor C1, the switch SW3, and the power supply E. The capacitor C1 is charged by the power supply E. Concurrently, the capacitor C1 is charged by releasing huge magnetic energy accumulated in the inductor L (i2 in FIG. 6B: refer to C1 charging current waveform). Then, at the same time, as the capacitor C1 and C2 are connected with the capacitor C3 and the load R, an output current flows through the load R, as the capacitor C3 is charged.

[Simultaneously Turning ON]

Next, at a time T5, when the switch SW3 keeps turning ON, the switch SW2 is turned ON (mode 1, other switch SW1 and SW4 are OFF), charging the capacitor C1 is stopped and a large amount of accumulated currents flows in a route of the power supply E, the inductor L, the switch SW2, the switch SW3, and the power supply E. And huge magnetic energy is accumulated in the inductor L (i3 in FIG. 5D: refer to L magnetically storing current waveform). Hereinafter, an operation at a time T6, T7, and T8 is similarly carried out as an operation at the time T2, T3, and T4 is made.

Accordingly, a plurality of switches, SW2 and SW3, are simultaneously turned ON, huge magnetic energy is accumulated in the inductor L (mode 1), subsequently, the switch SW2 and the switch SW3 are controlled ON/OFF, a charging current alternately flows into the capacitor C1 and C2 from the power supply E (a charging current in mode 2 or mode 3), then, the capacitor C1 and C2 are charged by a flywheel current brought by the huge magnetic energy accumulated in the inductor L, in addition to the charging current for the capacitor C1 and C2 from the power supply E. As a result, a step-up operation of voltage with the step-up ratio of two times or more can be achieved.

As described above, by making an ON-time duty ratio of each switch SW2 and SW3 50 percent or more, an input voltage can be optionally stepped up two times or more and is output. That is to say, an output voltage can be successively adjusted into a value in excess of two times an input voltage by setting the duty ratio 50 percent or more and controlling (adjusting) the charging current for the capacitor C1 and C2 from the power supply E and the flywheel current brought by the inductor L.

[Step-up Ratio is from One to Two Times]

Incidentally, as an operation with a step-up ratio of one to two times is equivalent to the operation explained in the conventional example of FIGS. 14A to 14E, a further explanation is omitted.

[Step-Down Mode]

Next, an operation of the DC/DC converter of the present invention in step-down mode (regenerative mode) will be explained. For example, a motor and the like is used as a load on the second input-output side in FIG. 1. When a cycle of the motor is controlled to decelerate (regenerative braking operation) and a voltage on the second input-output side (load) increases, a power supply like a battery on the first input-output side can be charged by stepping down a voltage on the second input-output side and returning energy to the first input-output side.

[High Step-Down Ratio]

FIGS. 7A to 7D show a diagram to explain an operation with a high step-down ratio (0 to 0.5 times) in step-down mode (regenerative mode). When the step-down ratio is high (0 to 0.5 times), that is, when a regenerative load is heavy and a regenerative voltage is high, for example, a voltage ratio applied to a regenerative power supply Eg and a load Rg shown in FIGS. 7A to 7D approximately ranges from 1:0 to 1:0.5.

In the case, as shown in FIGS. 7A to 7D, the switch SW2 in the IGBT part 1 and the switch SW3 in the IGBT part 2 are always turned OFF, the switch SW1 in the IGBT part 1 and the switch SW4 in the IGBT part 2 are alternately controlled ON/OFF, and the capacitor C1 and C2 are alternately connected and discharged. By alternately turning ON/OFF the switch SW1 and the switch SW4 during a period when the ON-time ratios of the switch SW1 and the switch SW4 range from 0 to 50 percent or less, a voltage (regenerative voltage V2) of the regenerative power supply Eg is stepped down with the step-down ratio of 0 to 0.5 times and is output across the load R as a voltage V1.

First, by referring FIG. 7A and FIG. 7B, an operation, wherein the switch SW1 is turned ON and a regenerative electric charge accumulated in the capacitor C1 is discharged, will be explained. At a time t1, when the switch SW1 is turned ON (other switches, the switch SW2, the switch SW3 and the switch SW4, are OFF), C1 discharging current I1 flows in a route of the capacitor C1, the switch SW1, the inductor L, the capacitor C4, the flywheel diode D3, and the capacitor C1. And then, magnetic energy is accumulated in the inductor L (I1 in FIG. 7B: refer to C1 discharging current waveform).

Next, At a time t2, when the switch SW1 is turned OFF (other switches, the switch SW2, the switch SW3 and the switch SW4, are OFF), an L flywheel current brought by the magnetic energy accumulated in the inductor L flows in a route of the inductor L, the capacitor C4, the flywheel diode D3, the flywheel diode D2 and the inductor L. The load Rg (power supply of DC power supply input part) is charged as the load Rg is connected with the capacitor C4 in parallel (I2 in FIG. 7B: refer to L flywheel current waveform).

In this context, the regenerative electric power accumulated in the capacitor C1 is returned to a power supply side and a voltage of the capacitor C1 drops. The capacitor C1 is recharged by the regenerative power supply Eg.

Next, by referring FIG. 7C and FIG. 7D, an operation, wherein the capacitor C2 is discharged, will be explained. At a time t3, when a gate voltage is applied to the switch SW4 of the IGBT part 2 and the switch SW4 is turned ON (other switches, the switch SW1, the switch SW2 and the switch SW3, are OFF), a discharging current I3 flows in a route of the capacitor C2, the flywheel diode D2, the inductor L, the capacitor C4, the switch SW4, and the capacitor C2. And then, magnetic energy is accumulated in the inductor L (I3 in FIG. 7D: refer to C2 discharging current waveform).

Figures 7B, 7D:
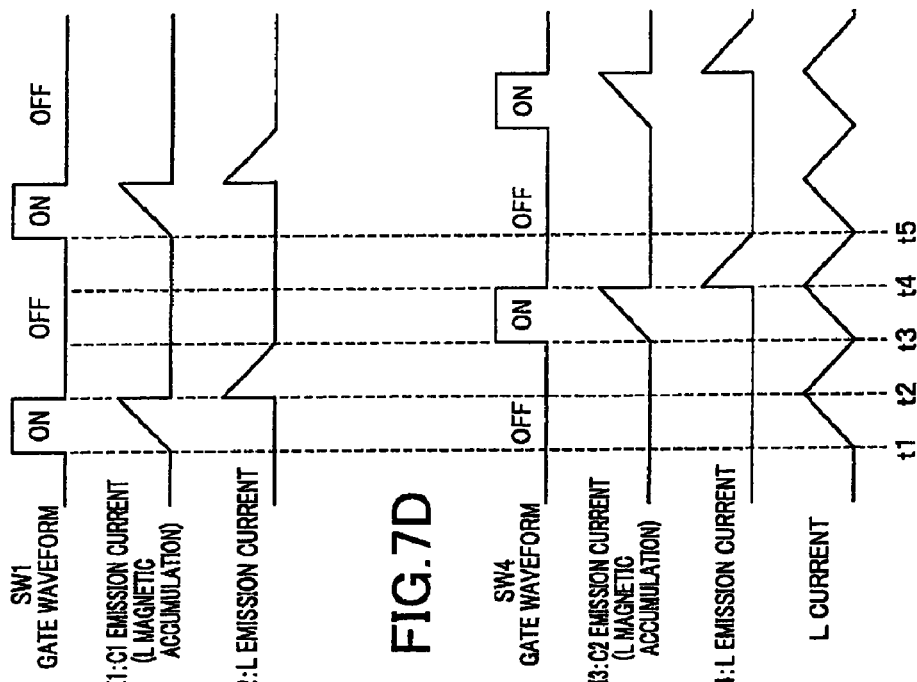

Next, At a time t4, when the switch SW4 is turned OFF (other switches, the switch SW1, the switch SW2 and the switch SW3, are OFF), a charging current I4 brought by the magnetic energy accumulated in the inductor L flows in a route of the inductor L, the capacitor C4, the flywheel diode D3, the flywheel diode D2, and the inductor L (I4 in FIG. 7D: refer to L flywheel current waveform). The load Rg (power supply of DC power supply input part) is charged as the load Rg is connected with the capacitor C4 in parallel.

In this context, the regenerative electric power accumulated in the capacitor C2 is returned to the power supply side and a voltage of the capacitor C2 drops. The capacitor C2 is recharged by the regenerative power supply Eg.

Consequently, by alternately discharging the capacitor C1 and C2, regenerative electric power from the regenerative power supply Eg connected with the second input-output part can be returned to the load Rg connected with the first input-output part.

[Low Step-Down Ratio]

FIGS. 8A to 8D show a step-down operation with a low step-down ratio (0.5 to 1 times) (a regenerative load is light), which is a feature of the present invention. To explain concisely, FIGS. 8A to 8D describe only elements pertinent to a step-down operation of voltage in the circuit shown in FIGS. 3A and 3B. In step-down mode, the switch SW2 and the switch SW3 are always OFF. The flywheel diode D2 of the switch SW2 and the flywheel diode D3 of the switch SW3 have a function of flowing a current in a forward direction. The first switch SW1 and the fourth switch SW4 are alternately controlled ON/OFF.

FIGS. 8A to 8D show gate voltage waveforms of the first switch SW1 and the fourth switch SW4, as similarly shown in FIG. 3C. In the present invention, a simultaneous ON-time period when the first switch SW1 and the fourth switch SW4 are simultaneously turned ON is set up. That is, a gate voltage waveform of the switch SW1 and a gate voltage waveform of the switch SW4 are overlapped with each other on their edges. That is, waveforms are "being lapped". A duty ratio of each gate voltage is over 50 percent of one cycle.

In FIG. 8A, a simultaneous ON period when the switch SW1 and the switch SW4 are timed to simultaneously turn ON is regarded as mode 1, a period when the switch SW1 is turned ON and the switch SW4 is turned OFF is regarded as mode 2, a period when the switch SW1 is turned OFF and the switch SW4 is turned ON is regarded as mode 3. In the present invention, in time sequence, mode changes in the order of mode 1, mode 2, mode 1, mode 3, mode 1, and mode 2. Thus, the control circuit part 4 (FIG. 3) controls a gate voltage by means of interposing mode 1 between mode 2 and mode 3, wherein the switch SW1 and the switch SW4 are alternately controlled ON/OFF.

[Simultaneously Turning ON]

First, mode 1 will be explained. In mode 1, as shown in FIG. 8C, the switch SW1 and the switch SW4 are simultaneously turned ON. A charging current flows through the capacitor C1 and C2 from the regenerative power supply Eg. On the other hand, energy is accumulated in the capacitor C1, C2, and the inductor L by flowing the current iL through the inductor L. Similarly, energy is discharged into the inductor L from the capacitor C1 and C2 which are connected in series.

[C1 Discharging Period]

Next, in mode 2, the switch SW1 is always turned ON and the switch SW4 is OFF. As shown in FIG. 8B, the flywheel diode D2 and D3 are brought in electrical continuity, a flywheel current brought by magnetic energy accumulated in this inductor L charges the capacitor C4. Then, a voltage across the inductor L is generated by discharging the magnetic energy accumulated in the inductor L. This voltage offsets potential difference between the load Rg and the capacitor C1 and allows a current to continue to flow. On the other hand, a charge accumulated in the capacitor C1 via the switch SW1 and the flywheel diode D3 is discharged and the capacitor C4 is charged (discharging period of the capacitor C). Accordingly, energy accumulated in this inductor L during mode 1 can be reduced. The load Rg is charged as the load Rg is connected with the capacitor C4 in parallel.

[Simultaneously Turning ON]

Next, as described above in mode 1, as shown in FIG. 8C, the switch SW1 and the switch SW4 are simultaneously turned ON. Energy is accumulated in the capacitor C1, C2, and the inductor L from the regenerative power supply Eg. Similarly, energy is discharged into the inductor L from the capacitor C1 and C2 which are connected in series. As a period when the switch SW1 and the switch SW4 are simultaneously turned ON is set up (T1 to T2, T3 to T4, T5 to T6, T7 to T8) and a large amount of currents can be flown through the inductor L by discharging the capacitor C1 and C2 in series, a release current of the inductor L can continuously be flown without interruption during mode 2 and mode 3.

[C2 Discharging Period]

Next, in mode 3, as shown in FIG. 8D, as the switch SW1 is turned OFF and the switch SW4 is ON, the flywheel diode D2 and D3 are brought in electrical continuity. Consequently, energy magnetically stored in this inductor L via the flywheel diode D2 and D3 is turned into a flywheel current and the capacitor C4 is charged. On the other hand, the capacitor C4 is charged by a discharging current of the capacitor C2 via the flywheel diode D2 and the switch SW4 (discharging period of the capacitor C2). Accordingly, energy accumulated in this inductor L during mode 1 can be reduced. The load Rg is charged as the load Rg is connected with the capacitor C4 in parallel.

According to this configuration, as a period when the inductor L discharges energy is corresponding to mode 2 and mode 3, the period is short. Moreover, as discharging energy from the capacitor C1 or C2 is added at this time, energy required to accumulate in the inductor L can be saved.

As a result, as shown at the lowest bottom of FIG. 8A, a sufficient output current iL passing the inductor L is generated, a range of variation of the output current iL (ripple |Arip|) narrows. In this context, noise reduction can be effectively carried out. A frequency of the current doubles. Therefore, in step-down mode (regenerative mode), a pause and intermittence of the output current iL can be avoided even if the step-down ratio is low (0.5 to 1 times).

If duty ratios of a gate voltage of each switch SW1 and SW4 are set 100 percent, that is, mode 1 covers all the period without mode 2 and mode 3, the switch SW1 and SW4 are always turned ON, and the input part and the output part in the circuit are connected. As a result, a step-down ratio becomes one time. Consequently, a step-down operation of voltage can efficiently be made even if the step-down ratio is near to one time. If the duty ratio is set 50 percent, that is, periods of mode 2 and mode 3 are equally set without a period of mode 1, the step-down ratio becomes ½ times (0.5 times). Thus, the step-up ratio can be adjusted in a range of 0.5 to 1 times by changing the duty ratio.

Next, a step-down operation, wherein the step-down ratio is low (0.5 to 1 times) (a regenerative load is light), will be explained again with reference to FIGS. 9A to 9C whose circuit configuration is similar to that of FIGS. 3A and 3B.

[Simultaneously Turning ON]

First, a discharging operation of the capacitor C1 will be explained with reference to FIG. 9A and FIG. 9B. At a time T1, as the switch SW1 is turned ON and the switch SW4 is also turned ON (mode 1), a current it flows in a route of the regenerative power supply Eg, the capacitor C1, the switch SW1, the inductor L, the capacitor C4, the switch SW4, the capacitor C2, and the regenerative power supply Eg (i1 in FIG. 9B: refer to C1 and C2 discharge current waveform). Then, energy is accumulated in the inductor L, the capacitor C1 and the capacitor C2 from the regenerative power supply Eg.

[C1 Discharging Operation]

Next, at a time T2, as the switch SW1 keeps turning ON and the switch SW4 is turned OFF, a flywheel current i2 of the capacitor C1 flows in a route of the capacitor C1, the switch SW1, the inductor L, the capacitor C4, the flywheel diode D3, and the capacitor C1. In this case, as the load Rg (power supply of DC power supply input part) is connected with the capacitor C4 in parallel, the load Rg is charged by the flywheel current of the capacitor C1 and the inductor L (i2 in FIG. 9B: refer to C1 flywheel current waveform). Similarly, a voltage across the inductor L is generated by discharging the magnetic energy accumulated in the inductor L. This voltage offsets potential difference between the load Rg and the capacitor C1 and allows a current to continue to flow.

[Simultaneously Turning ON]

Next, a discharging operation of the capacitor C2 will be explained by referring to FIG. 9B and FIG. 9C. At a time T3, when the switch SW4 is turned ON, as the switch SW1 is turned ON, mode 1 is set. Then, a flywheel current of the capacitor C1 and C2 flows in a route of the regenerative power supply Eg, the capacitor C1, the switch SW1, the inductor L, the capacitor C4, the switch SW4, the capacitor C2, and the regenerative power supply Eg. Energy is accumulated in the capacitor C1, C2, and the inductor L from the regenerative power supply Eg (i1 in FIG. 9B: refer to C1 and C2 discharging current waveform). As a period when the switch SW1 and the switch SW4 are simultaneously turned ON is set up (T1 to T2, T3 to T4, T5 to T6, T7 to T8) and a large amount of currents can be flown through the inductor L by discharging the capacitor C1 and C2 in series, a release current of the inductor L can continuously be flown without interruption during mode 2 and mode 3.

[C2 Discharging Operation]

Next, At a time T4, as the switch SW4 keeps turning ON and the switch SW1 is turned OFF (mode 3), a flywheel current of the capacitor C2 flows in a route of the capacitor C2, the flywheel diode D2, the inductor L, the capacitor C4, the switch SW4, and the capacitor C2. In this case, as the load Rg (power supply of DC power supply input part) is connected with the capacitor C4 in parallel, the load Rg is charged by the flywheel current of the capacitor C2 (i3 in FIG. 9B: refer to C2 flywheel current waveform). Hereinafter, an operation at a time T5, T6, T7, and T8 is similarly carried out as an operation at the time T1, T2, T3, and T4 is made.

Consequently, In a low step-down ratio (0.5 to 1 times) (a regenerative load is light), when a step-down operation of voltage is made by means of alternately turning ON/OFF the switch SW1 and SW4 and simultaneously turning ON the switch SW1 and SW4, a current i4 passing the inductor L can avoid interruption as shown at the lowest bottom of FIG. 9B. That is to say, in addition to applying the regenerative electric power alternately accumulated in the first capacitor C1 and the second capacitor C2 through the inductor L, the regenerative electric power accumulated in the first capacitor C1 and the second capacitor C2 in series can be applied to the inductor L. As a result, a sufficient output current i4 is generated, a range of variation of the output current i4 (ripple, |Arip|) narrows. In this context, noise reduction can be effectively carried out. A frequency of the current passing the inductor L increases (doubles). Therefore, in step-down mode (regenerative mode), a pause and intermittence of the output current can be avoided even if the step-down ratio is low (0.5 to 1 times).

If duty ratios of a gate voltage of each switch SW1 and SW4 are set 100 percent, that is, mode 1 covers all the period without mode 2 and mode 3, the switch SW1 and SW4 are always turned ON, and the input part and the output part in the circuit are connected. As a result, a step-down ratio becomes one time. Consequently, a step-down operation of voltage can efficiently be made even if the step-down ratio is near to one time. If the duty ratio is set 50 percent, that is, periods of mode 2 and mode 3 are equally set without mode 1, the step-down ratio becomes ½ times (0.5 times). Thus, the step-down ratio can be adjusted in a range of 0.5 to 1 times by changing the duty ratio. Then, a step-down ratio can variably be adjusted in succession in a range of zero to two times only by changing a duty ratio of a gate voltage of a switch.

FIGS. 10A to 10C show a diagram as an example of measured waveforms in each section in the DC/DC converter circuit of the present invention in step-up mode. FIG. 10A shows a waveform of a circuit shown in FIG. 10C at a time of an operation with a step-up ratio of one to two times (a duty ratio is 50 percent or less). FIG. 10B shows a waveform of a circuit shown in FIG. 10C at a time of an operation with a step-up ratio in excess of two times (a duty ratio is 50 percent or more).

In FIGS. 10A to 10C, a mark a1 in FIG. 10C shows a gate voltage waveform in turning ON/OFF the switch SW2, a mark a2 shows a current waveform passing the circuit from the DC power supply input part, a voltage waveform applied to the switch SW2 is measured by means of AC coupling and shown as a mark a3, and a current waveform passing a route connected between the switch SW1 and the capacitor C1 is measured by means of AC coupling and shown as a mark a4.

In view of these waveforms, it is fully understood that the explanations of the operations described above are appropriate.

Figure 11C:
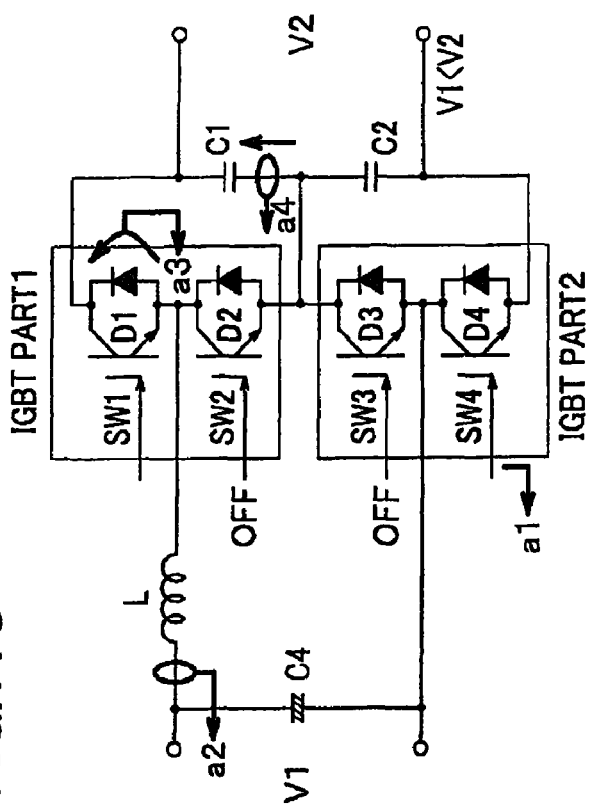
FIGS. 11A to 11C are diagrams showing a waveform measurement for each part at a time of a step-down operation as for the concrete step-up and step-down DC/DC converter circuit in the first embodiment of the present invention.
Figure 11A:
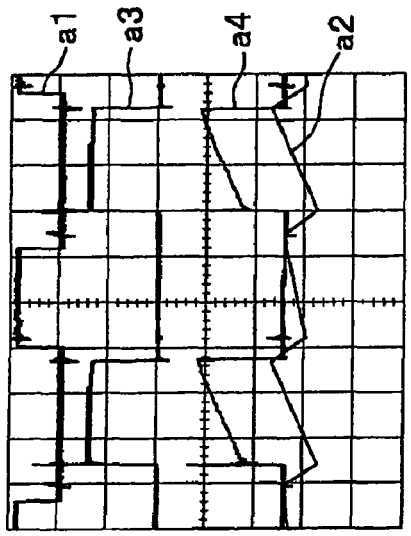
Figure 11B:
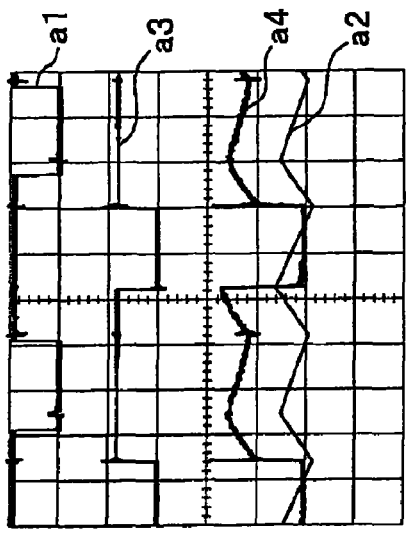

FIGS. 11A to 11C are diagrams showing a waveform measurement example for each part at a time of a step-down operation in an actual circuit as for the present invention. FIG. 11A shows a waveform of the circuit shown in FIG. 11C when a step-down ration is high (0 to 0.5 times) (a duty ratio is 50 percent or less). FIG. 11B shows a waveform of the circuit shown in FIG. 11C when the step-down ratio is low (0.5 to 1 times) (the duty ratio is 50 percent or more).

A mark a1 in FIGS. 11A to 11C show a gate voltage waveform in turning ON/OFF the switch SW4, a mark a2 shows a current waveform passing the circuit from the DC power supply input part, a mark a3 shows a current waveform passing the switch SW1 and a current waveform passing a route connected between the capacitor C1 and the capacitor C2 is measured by means of AC coupling and shown as a mark a4.

In view of these waveforms, it is fully understood that the explanations of the operations described above are appropriate.

FIGS. 12A to 12C show a circuit diagram for a step-up type electric power converter in a second preferred embodiment of the present invention.

A point of difference between the step-up type electric power converter of the second preferred embodiment and the DC/DC converter shown in FIGS. 2A and 2B is such that a diode d4 is used instead of the first switch SW4 in FIGS. 2A and 2B and a diode d1 is used instead of the first switch SW1 in FIG. 2 Similarly, another dissimilarity is that a first switch S1 and a second switch S2 respectively corresponding to the second switch SW2 and the third switch SW3 in FIG. 2 do not have any flywheel diode. As other elements are similar to those in the circuit of the preferred embodiment in shown FIGS. 2A and 2B, a same reference mark is attached and a further explanation is omitted. Switching control is made by the control circuit part 4, wherein a gate voltage with a step-up ratio of one to two times shown in FIG. 12B or a step-up ratio of two or more times shown in FIG. 12C is applied to gates of the first switch S1 and the second switch S2. As an operation of this step-up type electric power converter is substantially similar to the step-up operation of the DC/DC converter of the preferred embodiments shown in FIGS. 2A and 2B, FIGS. 5A to 5D, and FIGS. 6A to 6D, a further explanation is omitted.

Figure 13A:
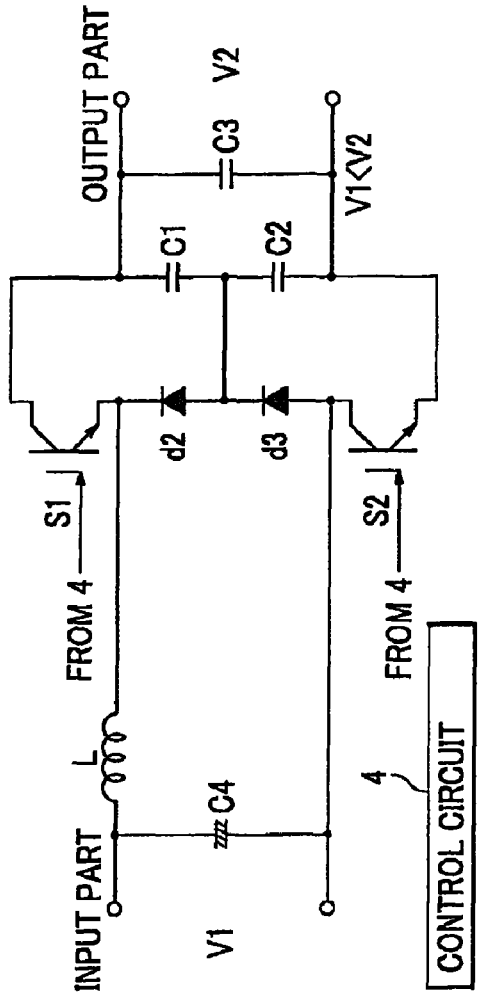
FIGS. 13A to 13C are diagrams showing a step-down DC/DC converter circuit of the electric power converter in another embodiment of the present invention.
Figure 13B:
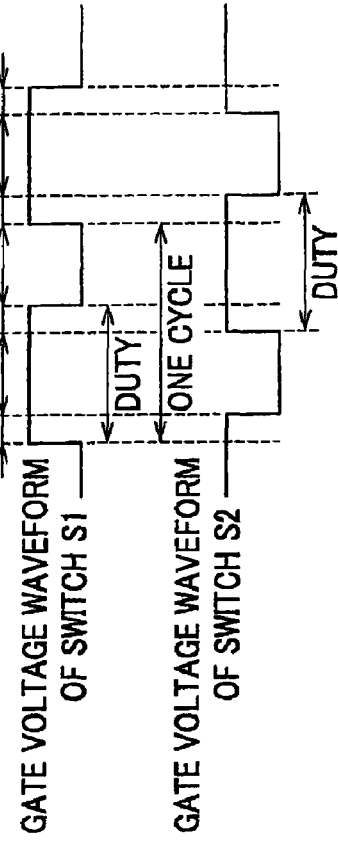
Figure 13C:
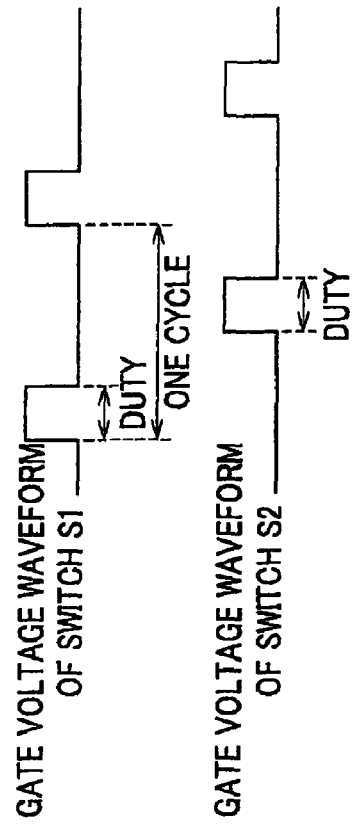

FIGS. 13A to 13C show a circuit diagram for a step-down type electric power converter in a third preferred embodiment of the present invention. A point of difference between the step-down type electric power converter of the third preferred embodiment and the DC/DC converter shown in FIGS. 3A and 3B is such that a diode d2 is used instead of the second switch SW2 in FIGS. 2A and 2B and a diode d3 is used instead of the third switch SW3 in FIGS. 2A and 2B. Similarly, another dissimilarity is such that the first switch 51 and the second switch S2 respectively corresponding to the first switch SW1 and the fourth switch SW4 in FIGS. 2A and 2B do not have any flywheel diode. As other elements are similar to those in the circuit of the preferred embodiment in shown FIGS. 3A and 3B, a same reference mark is attached and a further explanation is omitted. Switching control is made by the control circuit part 4, wherein a gate voltage with a step-down ratio of 0 to 0.5 times shown in FIG. 13B or a step-down ratio of 0.5 to 1 times shown in FIG. 13C is applied to gates of the first switch S1 and the second switch S2. As an operation of this step-down type electric power converter is substantially similar to the step-down operation of the DC/DC converter of the preferred embodiments shown in FIGS. 3A and 3B, FIGS. 7A to 7D, FIGS. 8A to 8D, and FIGS. 9A to 9C, a further explanation is omitted.

As described above, as for the electric power converter of the present invention, a step-up ratio of two times or more can be achieved by using two capacitors, C1 and C2. As a step-up operation can basically be achieved by a build-up effect of voltage brought by the capacitors, the inductor used for current control is greatly smaller in size (for example, 20 microhenry) than a conventional type (refer to Patent Document 1 JP 2006-271101A). Therefore, the present invention successfully realizes downsizing, weight reduction, and lower prices of the electric power converter.

At a time of a reverse step-down operation of voltage, the inductor L serves as an inductor used for a step-down voltage converter and allows a regenerative reverse step-down operation of voltage. In this case, as there is no intermittence of an output current and a ripple (a range of variation) narrows, even if a step-down ratio is low (0.5 to 1 times), noise is effectively reduced. Then, a step-down operation of voltage can be efficiently made even if the step-down ratio is near to one time. a step-down ratio can variably be adjusted in succession in a range of zero to one times only by changing a duty ratio of a gate voltage of a switch. Accordingly, the step-up electric power converter of the present invention successfully achieves a successive step-up ratio of one to two times or more, the step-down voltage converter of the present invention successfully achieves a variable step-down ratio of zero to one times in succession, and the step-up and step-down electric power converter of the present invention successfully makes a ratio of an output voltage to an input voltage variable in succession in a range of zero to two times or more.

Then, as an output voltage is divided and applied to the two capacitors, C1 and C2, an elimination of a high-voltage capacitor makes a capacitor with a reasonable price available. In an ordinary circuit, when a capacitor is used in parallel, a breeder resistance is necessary to prevent voltage bias. In the present invention, as the breeder resistance is not necessary, therefore, an efficiency of electric power voltage is improved. Then, as the number of switches used for switching control is two pieces or less, switching control can be easily made. Then, a single circuit corresponds to a step-up circuit, an electrical continuity circuit, and a regenerative circuit merely by changing switching elements in the single circuit. Further, In the present invention, as a current is continuous and a peak current decreases, a small switching element can be selected.

In the explanations of the preferred embodiments, the inductor L is placed on the positive side of the power supply. Even if the inductor L is placed on the negative side of the power supply, the same function and effect can be achieved. Similarly, in the explanations of the preferred embodiments, the first and second capacitors are a film capacitor. A ceramic capacitor and other capacitor are also applicable. If the ceramic capacitor is used, further downsizing can be achieved while an efficiency of electrical accumulation on a par with that of the film capacitor is maintained.

Further, according to the present invention, a regenerative block mode can be realized if an unnecessary regeneration needs to be blocked. In the regenerative block mode, the switch SW1 and SW4 are always turned OFF, respective flywheel diodes are activated.

The preferred embodiments of the present invention have been explained so far. The electric power converter of the present invention is not limited to the above-mentioned embodiments and it is needless to say that the present invention can take other various arrangements within a range that does not depart from a gist of the present invention.

The present invention can realize downsizing, weight reduction, and lower prices of the step-up electric power converter with a step-up ratio of two times or more. Similarly, the present invention can realize the step-down electric power converter, wherein a ratio of transforming can variably be adjusted in succession in a range of zero to one times. Then, the present invention, which has the effect of achieving a high efficiency in converting voltage, can be utilized in applications such as an input side circuit of an inverter, wherein a solar cell generates electric power from sunlight and increases a voltage of electric power generation to a level of system voltage (the same is applied to a FC (fuel cell) and wind power generation or the like), and a step-up operation used for a motor driving voltage of a hybrid system for a vehicle, a system which uses a load required to apply a voltage higher than an ordinary battery outputs, use for a mobile body such as an automobile and the like and for an electrical household appliance or the like, for which installation space is limited.

The invention claimed is:

1. An electric power converter of a switched capacitance type, comprising:
   a first input-output part;
   an inductor connected with either a positive electrode side or a negative electrode side of the first input-output part;
   a plurality of switches;
   a plurality of capacitors which are connected in series;
   a second input-output part connected with the plurality of capacitors; and
   a control circuit adapted to make ON/OFF control of the plurality of switches in accordance with mode of operation to selectively use the inductor and the plurality of capacitors to provide any operation out of step-up, step-down, regeneration, and electrical continuity, wherein
   the control circuit is adapted to control the mode of operation of two of the switches out of the plurality of switches in Modes 1, 2, and 3, in the following sequence:
   Mode 1, Mode 2, Mode 1, Mode 3, Mode 1, Mode 2, Mode 1, Mode 3, and so on,
   wherein during the Mode 1, which extends for a first predetermined time period, the two switches are simultaneously turned ON,
   during Mode 2, which extends for a second predetermined time period, one of the two switches is turned ON and the other of the two switches is turned OFF, and
   during Mode 3, which extends for a third predetermined time period, the one of the two switches is turned OFF and the other of the two switches is turned ON.

2. The electric power converter according to claim 1, wherein at least one of the first, second, and third predetermined time periods is different from the others of the first, second, and third predetermined time periods.

3. The electric power converter according to claim 1, wherein each of the first, second, and third predetermined time periods is different from the others of the first, second, and third predetermined time periods.

4. An electric power converter comprising:
   a first input-output part;
   a first capacitor and a second capacitor which are connected in series;
   a second input-output part connected with the first and second capacitors;
   an inductor connected with a positive electrode side or a negative electrode side of the first input-output part;
   a first switch with which the positive electrode side of the first input-output part is connected with the positive electrode side of the first capacitor and the positive electrode side of the second input-output part;
   a second switch with which the positive electrode side of the first input-output part is connected with the negative electrode side of the first capacitor and the positive electrode side of the second capacitor;
   a third switch with which the negative electrode side of the first input-output part is connected with the negative electrode side of the first capacitor and the positive electrode side of the second capacitor;
   a fourth switch with which the negative electrode side of the first input-output part is connected with the negative electrode side of the second capacitor and the negative electrode side of the second input-output part; and
   a control circuit which turns ON/OFF from the first switch to the fourth switch,
   wherein the control circuit controls in a step-up mode to have a period for which the second and third switches are alternately turned ON or OFF and a period for which the second and third switches are simultaneously turned ON,
   in a step-down mode, to have a period for which the first and fourth switches are alternately turned ON or OFF and the first and fourth switches are simultaneously turned ON.

5. An electric power converter comprising:
   an input part;
   a first capacitor and a second capacitor which are connected in series;
   an output part connected with the first capacitor and the second capacitor;
   an inductor connected with a positive electrode side or a negative electrode side of the input part;
   a first switch with which the positive electrode side of the input part is connected with a negative electrode side of the first capacitor and a positive electrode side of the second capacitor;
   a second switch with which the negative electrode side of the input part is connected with the negative electrode side of the first capacitor and the positive electrode side of the second capacitor; and
   a control circuit which turns adapted to turn ON/OFF the first switch and the second switch,
   wherein the control circuit controls operation of the first and second switches in a step-up mode in Modes 1, 2, and 3, in the following sequence:
   Mode 1, Mode 2, Mode 1, Mode 3, Mode 1, Mode 2, Mode 1, Mode 3, and so on,
   wherein during the Mode 1, which extends for a first predetermined time period, the first and second switches are simultaneously turned ON,
   during Mode 2, which extends for a second predetermined time period, the first switch is turned ON and the second switch is turned OFF, and
   during Mode 3, which extends for a third predetermined time period, the first switch is turned OFF and the second switch is turned ON; wherein the first and second switches are in series with third and fourth switches.

6. An electric power converter comprising:
   an output part;

a first capacitor and a second capacitor which are connected in series;

an input part connected with the first capacitor and the second capacitor;

an inductor connected with a positive electrode side or a negative electrode side of the output part;

a first switch with which the positive electrode side of the output part is connected with a positive electrode side of the first capacitor and a positive electrode side of the input part;

a second switch with which the negative electrode side of the output part is connected with a negative electrode side of second capacitor and a negative electrode side of the input part; and a control circuit adapted to turn ON/OFF the first switch and the second switch, wherein the control circuit controls operation of the first and second switches in a step-down mode in Modes 1, 2, and 3, in the following sequence:

Mode 1, Mode 2, Mode 1, Mode 3, Mode 1, Mode 2, Mode 1, Mode 3, and so on, wherein during the Mode 1, which extends for a first predetermined time period, the first and second switches are simultaneously turned ON, during Mode 2, which extends for a second predetermined time period, the first switch is turned ON and the second switch is turned OFF, and during Mode 3, which extends for a third predetermined time period, the first switch is turned OFF and the second switch is turned ON; wherein the first and second switches are in series with third and fourth switches.

* * * * *